(12) United States Patent (10) Patent No.: US 9,041,868 B2
Hirata et al. (45) Date of Patent: May 26, 2015

(54) PROJECTION IMAGE DISPLAY DEVICE COMPRISING A PLURALITY OF ILLUMINATION OPTICAL SYSTEMS

(75) Inventors: Koji Hirata, Yokohama (JP); Takashi Kakuda, Yokohama (JP); Nobuyuki Kimura, Yokohama (JP)

(73) Assignee: HITACHI MAXELL, LTD., Osaka (JP)

( * ) Notice: Subject to any disclaimer, the term of this patent is extended or adjusted under 35 U.S.C. 154(b) by 71 days.

(21) Appl. No.: 13/883,769

(22) PCT Filed: Feb. 24, 2012

(86) PCT No.: PCT/JP2012/054555
§ 371 (c)(1),
(2), (4) Date: Aug. 20, 2013

(87) PCT Pub. No.: WO2012/115228
PCT Pub. Date: Aug. 30, 2012

(65) Prior Publication Data
US 2014/0049698 A1 Feb. 20, 2014

(30) Foreign Application Priority Data
Feb. 25, 2011 (WO) ................. PCT/JP2011/054379

(51) Int. Cl.
| G02F 1/1335 | (2006.01) |
| G02B 27/26 | (2006.01) |
| G03B 21/00 | (2006.01) |
| G03B 21/14 | (2006.01) |
| G03B 21/20 | (2006.01) |
| G03B 33/06 | (2006.01) |
| G03B 33/12 | (2006.01) |
| G03B 35/26 | (2006.01) |
| H04N 9/31 | (2006.01) |
| H04N 13/04 | (2006.01) |

(52) U.S. Cl.
CPC .............. *G02B 27/26* (2013.01); *G03B 21/006* (2013.01); *G03B 21/142* (2013.01); *G03B 21/2013* (2013.01); *G03B 21/2026* (2013.01); *G03B 21/2073* (2013.01); *G03B 33/06* (2013.01); *G03B 33/12* (2013.01); *G03B 35/26* (2013.01);
(Continued)

(58) Field of Classification Search
CPC ..... G02B 27/26; G02B 21/006; G02B 21/008
USPC ........................................... 349/5, 8
See application file for complete search history.

(56) References Cited

U.S. PATENT DOCUMENTS

| 2008/0037116 A1 | 2/2008 | Alasaarela et al. |
| 2008/0062386 A1 | 3/2008 | Ito |

(Continued)

FOREIGN PATENT DOCUMENTS

| JP | 6-18838 | 1/1994 |
| JP | 7-231460 | 8/1995 |

(Continued)

*Primary Examiner* — Paul Lee
(74) *Attorney, Agent, or Firm* — Baker Botts L.L.P.

(57) ABSTRACT

The purpose of the present invention is to provide a projection image display device in which all of the multiple light sources to be used are positioned optimally, regardless of the mode of installation of the device. This projection image display device has two illumination optical systems (1, 2) that are each provided with a light source (111, 211), a color separator for separating into three colors of light, a liquid crystal panel (150, 250) for forming an optical image, and a color synthesis prism (160, 260) for color-synthesizing. A polarization beam splitter (3) for synthesis synthesizes an optical image formed by the illumination optical system (1, 2), and projects the same from a projection lens (4). The optical axis (101, 201) of each light source (111, 211) is positioned within the same plane as the optical axis (401) of the projection lens (4), and so as to orthogonally intersect the optical axis (401) of the projection lens.

19 Claims, 16 Drawing Sheets

(52) U.S. Cl.
CPC ............ *G03B 21/008* (2013.01); *G03B 21/005* (2013.01); *H04N 9/3147* (2013.01); *H04N 9/3164* (2013.01); *H04N 9/3188* (2013.01); *H04N 13/0459* (2013.01); *H04N 13/0431* (2013.01); *H04N 13/0434* (2013.01)

(56) References Cited

U.S. PATENT DOCUMENTS

| | | |
|---|---|---|
| 2010/0171938 A1 | 7/2010 | Amano |
| 2010/0225885 A1* | 9/2010 | Miyazawa ............... 353/20 |

FOREIGN PATENT DOCUMENTS

| | | |
|---|---|---|
| JP | 2003-185969 | 7/2003 |
| JP | 2006-78949 | 3/2006 |
| JP | 2007-133129 A | 5/2007 |
| JP | 2008-46621 | 2/2008 |
| JP | 2008-65250 | 3/2008 |
| JP | 2009-128689 | 6/2009 |
| JP | 2009-192971 | 8/2009 |
| JP | 2010-160232 A | 7/2010 |
| JP | 2010-204333 | 9/2010 |
| JP | 2010-243779 A | 10/2010 |
| JP | 2011-002612 A | 1/2011 |

* cited by examiner

OPTICAL AXIS IS HORIZONTAL

OPTICAL AXIS IS TILTED

PROJECTION IMAGE DISPLAY DEVICE COMPRISING A PLURALITY OF ILLUMINATION OPTICAL SYSTEMS

TECHNICAL FIELD

The present invention relates to a projection image display device.

BACKGROUND ART

There has been known a projection image display device (projector) for separating light emitted from a light source into three colors of R (red), G (green), and B (blue), optically modulating the respective color lights by a liquid crystal panel according to an image signal, synthesizing again the optically modulated color lights, and enlarging and projecting an image of the synthesized color. The projection image display device includes an illumination optical system (optical image forming unit) for irradiating the liquid crystal panel with light emitted from the light source to form an optical image, and an enlargement projection system for enlarging and projecting the optical image emitted from the illumination optical system. Further, there has also been proposed a projection image display device (compound projector) including two such illumination optical systems, in which optical images emitted from each of the illumination optical systems are synthesized and the synthesized optical image is projected from one enlargement projection system. For example, Patent Document 1 discloses a configuration having two illumination optical systems, and an adjustment mechanism for adjusting the positional relationship between the two illumination optical systems. Further, Patent Document 2 discloses a configuration for synthesizing each of the color lights by converting R, B lights to S polarized light and by converting G light to P polarized light. The proposed configuration is also designed to synthesize the optical images from the two illumination optical systems by adjusting one optical image to S polarized light, and by adjusting the other optical image to P polarized light. Further, Patent Document 3 discloses a configuration having two illumination optical systems, in which image lights of different polarizations from two liquid crystal panels are synthesized by a half mirror, and a three-dimensional image is projected on a screen.

CITATION LIST

Patent Document 1: Japanese Patent Laid-Open Publication No. 2009-192971
Patent Document 2: Japanese Patent Laid-Open Publication No. 2010-204333
Patent Document 3: Japanese Patent Laid-Open Publication No. Hei 7 (1995)-231460

SUMMARY OF INVENTION

Technical Problem

In the projection image display devices (compound projectors) proposed in Patent Documents 1, 2, and 3, the optical axis direction emitted from the light source of a first illumination optical system is parallel to the optical axis direction projected from the enlargement projection system, while the optical axis direction emitted from the light source of a second illumination optical system is orthogonal to the optical axis direction projected from the enlargement projection system. This is because the first and second illumination optical systems having the same configuration are disposed at a 90 degree angle relative to one another.

As for the installation mode of the projection image display device, in general, floor standing installation for mounting the device parallel on a desk, as well as ceiling hanging installation for hanging the device from the ceiling are commonly used. However, other installation modes, such as upward projection installation for projecting onto the ceiling and downward projection installation for projecting onto a desk, are also used according to the application. In this case, the direction of the optical axis emitted from the light source may vary not only the horizontal direction but also the vertical direction (namely, the direction of gravity), as well as the oblique direction between the horizontal and vertical directions. For example, when the projector device shown in FIG. 1, which is disclosed in Patent document 1, is installed upward or downward, the optical axis of a light source 211 of an image projection device 2A is the vertical direction, and the optical axis of the light source 211 of an image projection device 2B is the horizontal direction. According to the study of the inventors, when the optical axis of a light source such as a high-pressure mercury lamp is disposed horizontally, an arc discharge is formed symmetrically between electrodes, showing good light emission characteristics. However, the inventors found a phenomenon that when the optical axis is disposed at an angle, the arc discharge is not symmetrical and the light emission efficiency is reduced. As a result, the lifetime of the light source is reduced. As described above, in view of various installation modes of the projection image display device, further consideration should be made to the layout when a plurality of light sources are used in the projection image display device.

The purpose of the present invention is to provide a projection image display device using a plurality of light sources that are all appropriately positioned regardless of the installation mode of the device.

Solution to Problem

According to an aspect of the present invention, there is provided a projection image display device for projecting an optical image formed by a plurality of illumination optical systems, from a projection lens. Each of the plurality of illumination optical systems includes: a light source for generating illumination light; a color separator for separating the generated illumination light into three color lights of R (red), G (green), and B (blue); three liquid crystal panels for forming optical images by irradiation with the respective color lights; and a color synthesis unit for synthesizing the optical images of the different color lights. The optical axis of each of the color light sources is positioned in the same plane as the optical axis of the projection lens. At the same time, all the axes of the respective light sources are orthogonal to the optical axis of the projection lens. Further, of the plurality of illumination optical systems, two illumination optical systems are disposed so that the optical path of the illumination light generated by each light source, and the optical paths of the three color lights divided by the respective color separators, are rotated by 90 degrees with respect to each other.

Further, the projection image display device also includes: a synthesizing polarization beam splitter for synthesizing the optical images formed by the plurality of illumination optical systems; and one projection lens for projecting an optical image synthesized by the synthesizing polarization beam splitter. A color selection polarization rotator is provided on two light incident surfaces of the synthesizing polarization beam splitter, for polarization rotation with respect to the light in a selected wavelength band. By using the color selection polarization rotator, the polarization of one incident optical image is aligned to a predetermined direction, and the other incident optical image is aligned to the direction orthogonal to the specific direction.

Advantageous Effects of Invention

According to the present invention, it is possible to provide a projection image display device using a plurality of light sources that can achieve good emission performance, regardless of the installation mode of the device.

DESCRIPTION OF EMBODIMENTS

Hereinafter, embodiments of the present invention will be described with reference to the accompanying drawings. Note that components having the same function are denoted by the same reference symbols throughout the drawings.

First Embodiment

Figure 1:
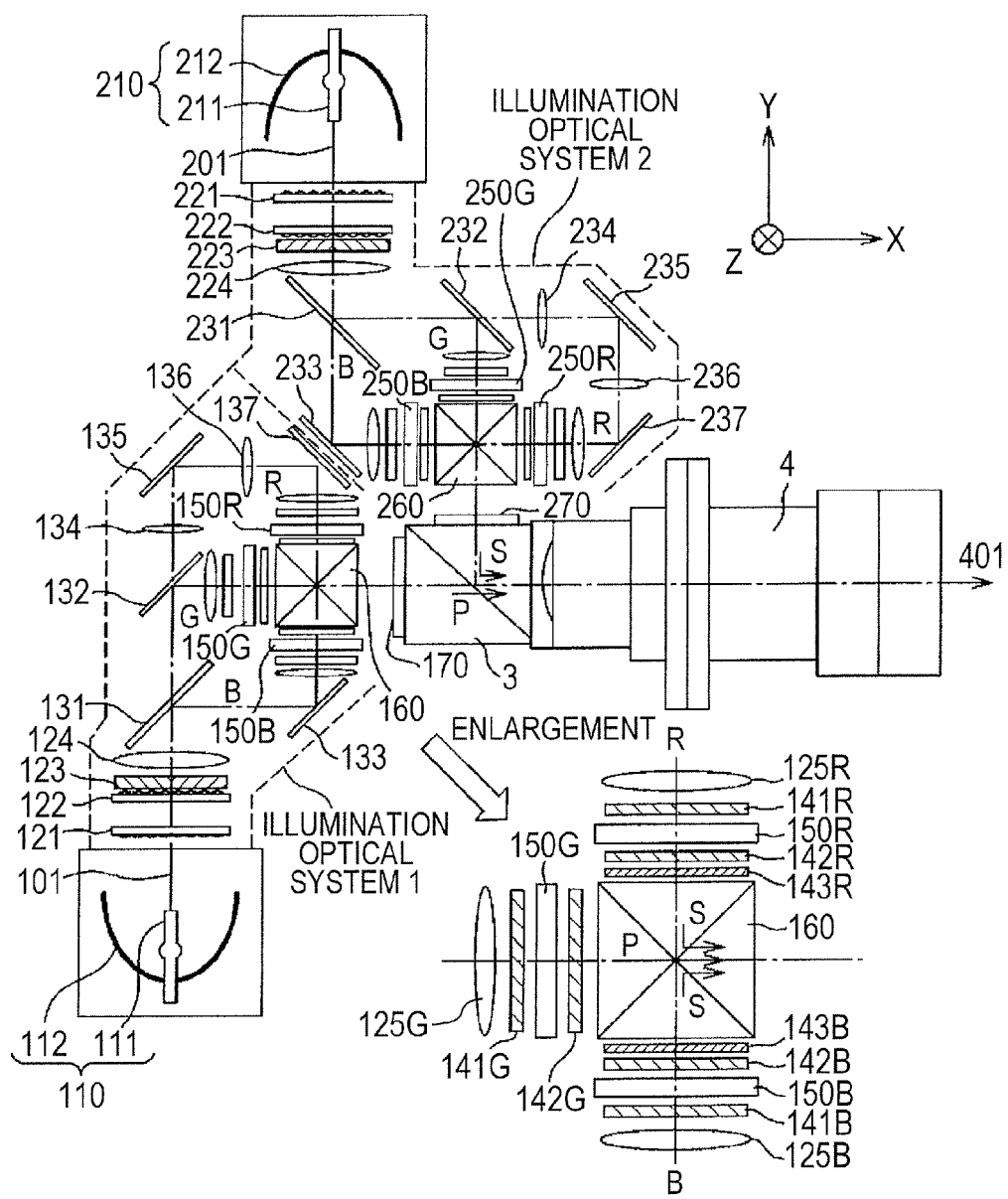
FIG. 1 is an overall block diagram of a projection image display device according to a first embodiment.

FIG. 1 is an overall block diagram of a projection image display device according to a first embodiment. Note that in FIG. 1, the letters R (red color), G (green color), and B (blue color) indicating color lights are added to the reference numerals of the elements provided in the optical paths of the respective color lights. Further, as shown in the figure, the X axis, Y axis, and Z axis are defined for the description of the optical axis direction and the like. At this time, the XY plane (the plane parallel to the paper) is the installation plane when the projection image display device is mounted horizontally.

The projection image display device according to the present embodiment includes two illumination optical systems 1, 2 for forming optical images, an optical synthesis unit 3 for synthesizing the two optical images, and a projection unit 4 for enlarging and projecting the synthesized optical image. Each of the illumination optical systems 1 and 2 includes not only a light source, but also a color separator, a relay optical system, a liquid crystal panel which is an optical image forming device, and a color synthesis prism which is a color synthesis means, and the like. Further, a synthesizing polarization beam splitter (synthesizing PBS) is used for the color synthesis unit 3, and a projection lens is used for the projection unit 4. In the present embodiment, an optical axis 101 of a light source 111 in the illumination optical system 1, an optical axis 201 of a light source 211 in the illumination optical system 2, and an optical axis 401 of the projection lens 4 are all positioned in the same plane (the XY plane). Then, both the optical axes 101, 201 of the light sources 111, 211 in the illumination optical systems 1, 2 are defined as the Y direction, while the optical axis 401 of the projection lens 4 is defined as the X direction. In other words, the directions of the optical axes 101 and 201 of the respective light sources are orthogonal to the direction of the optical axis 401 of the projection lens.

Hereinafter, the configurations of the individual components will be described. It is to be noted that most parts of the two illumination sources 1, 2 are the same, so that mainly the illumination optical system 1 will be described. The illumination optical system 1 is functionally divided into an illumination generator, a color separator, a relay optical system, an optical image forming device, and a color synthesis unit.

The illumination generator includes: a light source unit 110 in which a light source (lamp) 111 such as a high-pressure mercury lamp, and a reflector 112 are provided; first and second array lenses 121, 122 constituting an optical integrator; a polarization conversion element 123; a condensing lens 124; and field lenses 125R, 125G, and 125B. The color separator separates the illumination light from the light source 111 into three lights of R, G, and B colors. Such a color separator includes two dichroic mirrors 131, 132, and a reflection mirror 133. Further, the relay optical system includes relay lenses 134, 136, and reflection mirrors 135, 137 for changing the optical path direction.

The optical image forming device includes transmissive liquid crystal panels 150R, 150G, and 150B, which are optical image forming elements for the respective color lights. Light-incident-side polarization plates 141R, 141G, 141B are provided on the light incident side of each of the liquid crystal panels 150R, 150G, 150B. Also, light-emission-side polarization plates 142R, 142G, 142B are provided on the light emission side of each of the liquid crystal panels. Further, a ½ wavelength plates 143R, 143B are provided on the light emission side of the R light-emission-side polarization plate 142R, and on the light emission side of the B light-emission-side polarization plate 142B. A color synthesis prism 160 is provided as a color synthesis unit on the light emission side of each of the liquid crystal panels 150R, 150G, 150B. The color synthesis prism 160 is an element (a cross dichroic prism) in which a dichroic film reflecting the R light and a dichroic film reflecting the B light are formed on the interface of four right-angle prisms in a substantial X shape (cross shape). A color selection polarization rotator 170 is provided on the light emission side of the color synthesis prism 160. The color selection polarization rotator 170 is an element for polarization rotation with respect to the light in a selected wavelength band. Here, the color selection polarization rotator 170 rotates the polarization direction by 90 degrees with respect to the R light and the B light.

The operation of the illumination optical system 1 will be described. The light emitted from the light source 111 is reflected by the reflector 112 having a paraboloid of revolution-shaped reflective surface. The reflected light is substantially parallel to the optical axis 101. Then, a substantially parallel light flux is emitted from the light source unit 110. The light emitted from the light source unit 110 is incident to the polarization conversion integrator. The polarization conversion integrator includes an optical integrator having a first array lens 121 and a second array lens 122 to perform uniform illumination. The polarization conversion integrator also includes a polarization conversion element 123 of the polarization beam splitter array to align the polarization direction of the light to a specific polarization direction, and convert to a linearly polarized light. The light from the second array lens 122 is aligned to a specific polarization direction, or in this case, S polarized light (the light in which the polarization direction is the Z direction in the XZ plane orthogonal to the optical axis 101). Then, the light is incident to the color separator through the condensing lens 124.

The color separator separates the substantially white light emitted from the illumination light generator into R light, G light, and B light. Then, the color separator guides the three color lights into the optical paths (R optical path, G optical path, and B optical path) to the corresponding liquid crystal panels 150R, 150G, 150B, respectively. In other words, the B light reflected by the dichroic mirror 131 is reflected by the reflection mirror 133, and passes through the field lens 125B and the light-incident-side polarization plate 141B, which is then incident to the liquid crystal panel 150B for the B light (B optical path). Further, the G and R lights passing through the dichroic mirror 131 are separated into G light and R light by the dichroic mirror 132. The G light is reflected by the dichromic mirror 132, and passes through the field lens 125G and the light-incident-side polarization plate 141G, which is then incident to the liquid crystal panel 150G for the G light (G optical path). The R light passing through the dichroic mirror 132 passes through the relay optical system, the field lens 125R, and the light-incident-side polarization plate 141R, which is then incident to the liquid crystal panel 150R for the R light (R optical path). In the relay optical system, the R light passing through the relay lens 134 and the reflective mirror 135 is collected in the vicinity of the relay lens 136, and is diffused into the field lens 125R. Each of the filed lenses 125R, 125G, 125B makes the incident light substantially parallel to the optical axis. In this way, the light emitted from the light source unit 110 in a random polarization direction is separated into the respective color lights, which are then aligned to a specific polarization direction (in this case, S polarization) to uniformly irradiate the respective liquid crystal panels.

The degree of polarization of the light incident to the optical image forming device is increased by the light-incident-side polarization plates 141R, 141G, 141B that allow only the S polarized light to pass through and irradiate each of the liquid crystal panels 150R, 150G, and 150B. In each liquid crystal panel, the intensity of the light is modulated according to the image signal to form an optical image of the P polarized light with respect to each color light. Then, the unwanted S polarized light component is removed by the light-emission-side polarization plates 142R, 142G, 142B to increase the contrast. Further, with respect to the R light and the B light, the optical image of the P polarized light is converted to an optical image of the S polarized light by the ½ wavelength plates 143R, 143B. As a result, the optical images of the R and B lights are converted to S polarized images, while the P polarized optical image of the G light remains unchanged. Then, the S polarized optical images of the R and B lights as well as the P polarized optical image of the G light are incident to the color synthesis prism 160 which is the color synthesis unit. This is in view of the spectroscopic characteristics of the dichroic film of the color synthesis prism 160 to efficiently perform color synthesis by a so-called SPS synthesis in which the R and B lights are S polarized and the G light is P polarized.

Of the three incident faces of the color synthesis prism 160, the R and B lights incident to the opposite incident planes are reflected by the crossed dichroic films for the R light and for the B light, respectively. Further, the G light incident to the center incident plane passes through each of the dichroic films. The optical images of the individual color lights are synthesized into a color optical image, which is emitted from the light-emitting plane.

The color optical image emitted from the color synthesis prism 160 is incident to the color selection polarization rotator 170. The color selection polarization rotator 170 converts the S polarized light to the P polarized light for the R and B optical elements of the color optical image, while allowing the P polarized light, which remains unchanged for the G optical element of the color optical image, to pass through. As a result, the color optical image passing through the color selection polarization rotator 170 is aligned to the P polarization with respect to all the color components. In this way, by providing the color selection polarization rotator 170, the color optical image formed by the illumination optical system 1 can be P polarized and emitted to the next synthesizing polarization beam splitter 3.

The configuration and operation of the illumination optical system 1 have been described above. The configuration and operation of illumination optical system 2 are basically the same as those of the illumination optical system 1. The illumination optical system. 2 is different from the illumination optical system 1 in that the optical path of the illumination generator and the optical path of the color separator are rotated by 90 degrees with respect to each other. Thus, the dichroic mirror 231 is designed to reflect the R light and the G light, while allowing the B light to pass through. Further, a color selection polarization rotator 270 is provided on the light emission side of the color synthesis prism 260. The color selection polarization rotator 270 is designed to rotate the polarization direction by 90 degrees with respect to the G light.

The color optical image emitted from the color synthesis prism 260 is incident to the color selection polarization rotator 270. The color selection polarization rotator 270 converts the P polarized light to the S polarized light with respect to the G light of the color optical image, while allowing the R and B lights to pass through with the S polarized light remaining unchanged. As a result, all the color components of the color optical image passing through the color selection polarization rotator 270 are S polarized. In this way, by using the color selection polarization rotator 270, the color optical image formed by the illumination optical system 2 can be S polarized and emit to the next synthesizing polarization beam splitter 3.

The synthesizing polarization beam splitter 3 synthesizes the optical images formed by the illumination optical systems 1 and 2. The synthesizing polarization beam splitter 3 has a structure in which two triangle prisms are bonded together and a dielectric multilayer film is formed on the interface of the two triangle prisms. Then, the optical image of the P polarized light emitted from the illumination optical system 1 is reflected by the interface, while the optical image of the S polarized light emitted from the illumination optical system 2 passes through the interface. In this way, the two orthogonal incident optical images can be synthesized. At this time, the low contrast component (the component close to the S polarized light) of the P polarized light emitted from the illumination optical system 1 is reflected by the interface. On the other hand, the low component (the component close to the P polarized light) of the S polarized light emitted from the illumination optical system 2 passes through the interface. As a result, high contrast can be achieved in the synthesized optical image.

The synthesized optical image emitted from the polarization beam splitter 3 is enlarged and projected by the projection lens 4 having a zoom function with a plurality of single lenses, on an image projection surface such as a screen (not shown).

Both in the illumination optical systems 1 and 2 according to the present embodiment, it is designed to allow the R light to pass through the relay optical system, so that the length of the optical path is long. On the other hand, the length of the optical path of the B light is short and the loss of the amount of light (light intensity) is the smallest. As a result, there is the effect of increasing the color temperature of the white display.

With the configuration of the present embodiment, the optical axes of the two light sources are kept horizontal regardless of the installation mode of the projection image display device. This is because in the case of the standing installation and the ceiling hanging installation, the optical axis 401 (X direction) of the projection lens and each of the optical axes 101, 201 (Y direction) of the respective light sources are positioned in the horizontal plane. Further, in the case of the upward projection installation and the downward projection installation, the optical axis 401 of the projection lens is in the vertical direction (direction of gravity), but the optical axes 101, 201 of the respective light sources remain in the horizontal direction. Further, even if the optical axis 401 of the projection lens is the oblique direction, the optical axes 101, 102 of the respective light sources remain in the horizontal direction. This is because the installation mode of the device can be changed by rotating the device around the axis parallel to the direction of each of the optical axes 101, 201 of the respective light sources (Y direction).

Figure 5A:
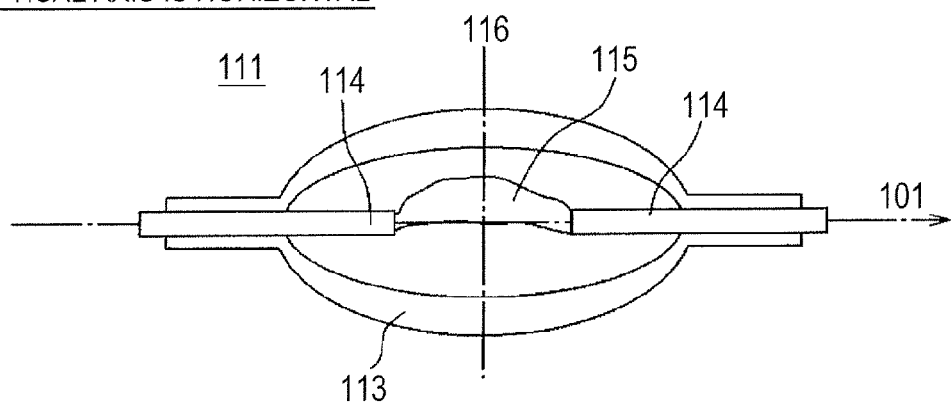
FIG. 5A is a view schematically showing the arc discharge state of a high-pressure mercury lamp (in which the optical axis is horizontal)
Figure 5B:
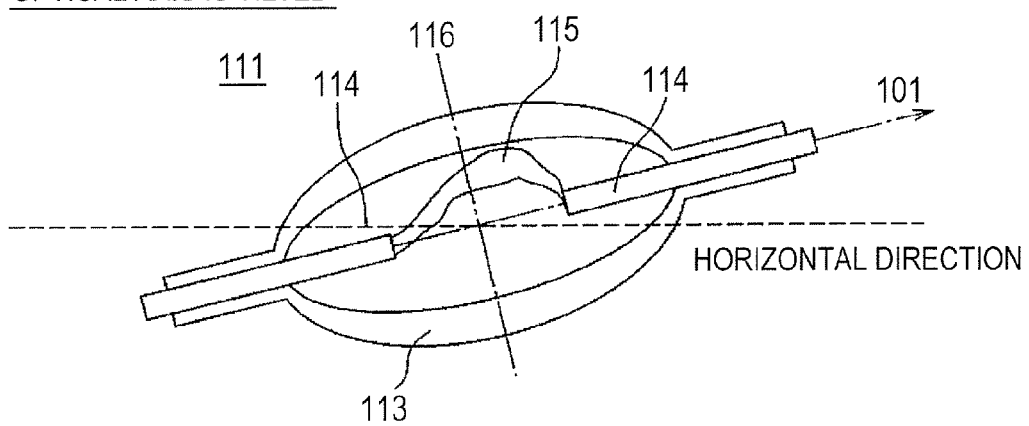
FIG. 5B is a view schematically showing the arc discharge state of the high-pressure mercury lamp (in which the optical axis is tilted)

Next, the effect of keeping the optical axes 101, 201 of the respective light sources horizontal will be described. FIGS. 5B and 5A are views schematically showing the arc discharge state of the high-pressure mercury lamp 111 used for the light source. FIG. 5A shows the state in which the optical axis 101 of the lamp emission is horizontal. FIG. 5B shows the state in which the optical axis 101 is tilted. The high-pressure mercury lamp 111 generates an arc discharge between electrodes 114 placed in a tube 113 of quartz glass filled with mercury, causing the vaporized mercury to collide with electrons to emit light. At this time, the shape of the arc discharge generated between the electrodes is denoted by reference numeral 115. Reference numeral 116 denotes the center line between the two electrodes 114. The light emitted from the lamp 111 is reflected by a reflector, not shown, which is provided on the left side of the lamp 111, and emitted on the right side substantially parallel to the direction of the optical axis 101. In other words, the direction of the optical axis 101 is the same as the direction connecting the two electrodes 114.

In the case of FIG. 5A in which the optical axis 101 is horizontally oriented, an arc discharge 115 is symmetrical with respect to the two electrodes (the center line 116). In this case, the light emission effect of the lamp is the highest, and the two electrodes 114 are equally consumed.

On the other hand, in the case of FIG. 6B in which the optical axis 101 is tilted, the arc discharge 115 is not symmetrical with respect to the two electrodes (the center line 116). This is because the shape of the arc is extended in the direction opposite to the gravity. In this case, the discharge reactor heats a part of the tube (quartz glass) 113. The part of the tube becomes white and the light emission effect of the lamp is reduced. Further, the electric field concentration in the two electrodes 114 is asymmetrical about the electrode axis, so that the two electrodes are not consumed equally. As a result, the lifetime of the lamp is reduced. In particular, when the installation mode of the device is the upward projection installation or the downward projection installation, there may be a case in which the optical axis 101 is substantially the vertical direction (direction of gravity). In this case, it is difficult to achieve stable light emission operation. Note that even if the optical axis 101 is tilted, the asymmetric property of the arc shape is small as long as the tilted angle is small, so that the influence on the light emission performance is small. In other words, the tilt of the optical axis that occurs in the adjustment of the installation posture of the device is not a problem for performance and can be allowed.

As described above, according to the present embodiment, the two light sources can perform light emission operation with the appropriate posture in which each of the optical axes of the respective light sources is in the horizontal direction, regardless of the installation mode of the projection image display device. As a result, it is possible to achieve the highest light emission performance and lifetime of the light source.

By using the projection image display device according to the present embodiment, the following display functions can be achieved.

(1) High resolution: Corresponding pixels of the two liquid crystal panels 150 and 250 are displaced by a predetermined distance, which are alternately displayed in order to increase the resolution of the displayed image.

Figure 4A:
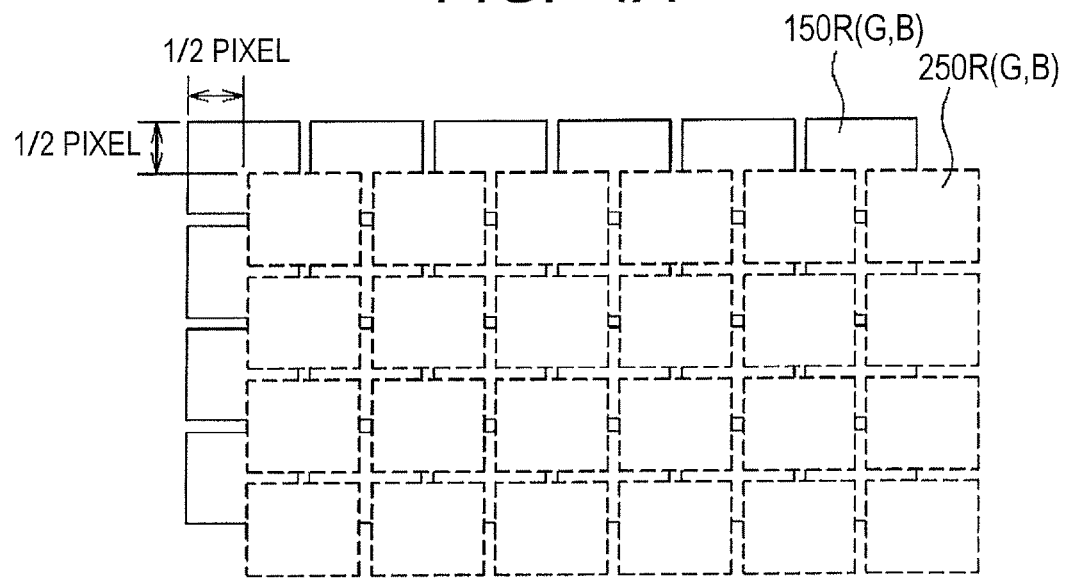
FIG. 4A is a view schematically showing an example in which two liquid crystal panels are displaced from each other.

FIG. 4A is a view schematically showing an example in which the two liquid crystal panels are displaced from each other. For example, two XGA panels (1024×768) are prepared for the R light liquid crystal panel 150R of the illumination optical system 1, and for the R light liquid crystal panel 240R or the illumination optical system 2. Then, the two panels are displaced by ½ pixels both in the vertical and horizontal directions. This is the same for the G light liquid crystal panels 150G, 250G and for the B light liquid crystal panels 150B, 250B. Then, the panel 150 and the panel 250 are alternately displayed for each field. More specifically, the panel 250 is displayed in black when the panel 150 is displayed, while the panel 150 is displayed in black when the panel 250 is displayed. In this way, it is possible to display with the resolution of QXGA (2048×1536) corresponding to the four times higher in a simulated manner. At this time, screen flicker may occur at the normal frequency of 60 Hz, so that the field frequency is preferably 90 Hz or more. More preferably, a high drive frequency of 120 Hz or more is recommended to switch the field in order to prevent the screen flicker from being seen.

Figure 4B:
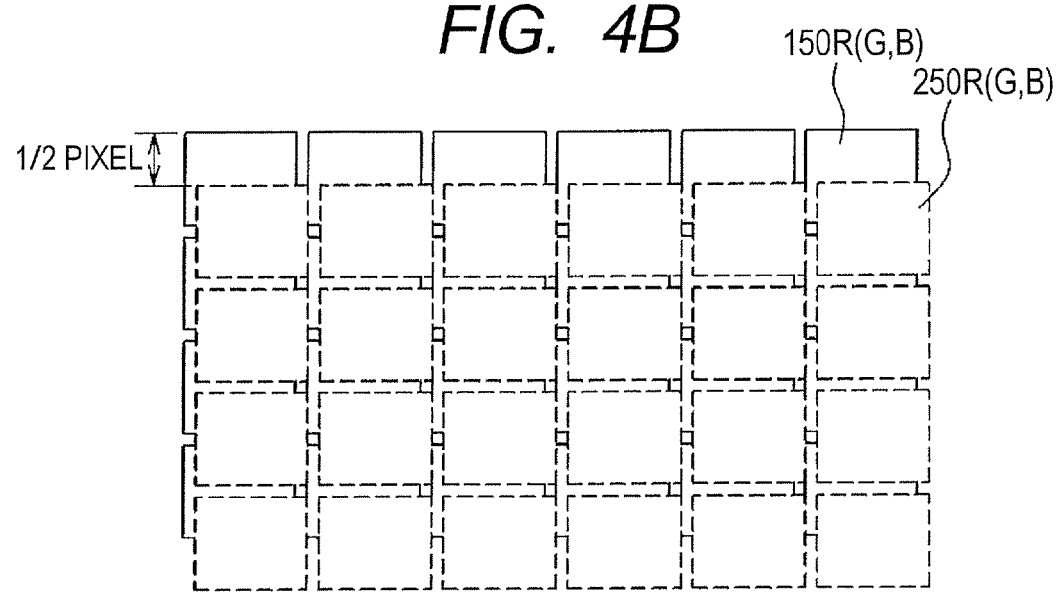
FIG. 4B is a view schematically showing another example in which two liquid crystal panels are displaced from each other.

FIG. 4B is a view schematically showing another example in which two liquid crystal panels are displaced from each other. In this example, the liquid crystal panels 150 (G, B) and the liquid crystal panels 250R (G, B) are displaced by ½ pixels only in the vertical direction. Also with this configuration, it is possible to increase the vertical resolution by two times.

(2) Longer lifetime of the light source: The operation mode can be selected from single mode (using only one illumination optical system) or twin mode (using the two illumination optical systems at the same time) by switching the use of the two illumination optical system 1, 2. In the single mode, the use of the two light sources is changed at regular intervals. In other words, the light emission of each light source is stopped for a certain period of time, resulting in the effect of increasing the operation lifetime of the light source compared to the case of continuously emitting light by one light source. In the twin mode, the amount of light emitted from one light source is reduced to the half. Thus, relatively inexpensive and low-intensity light sources can be combined and used at the same time, in total contributing to reducing the cost of the projection image display device.

Second Embodiment

Figure 2:
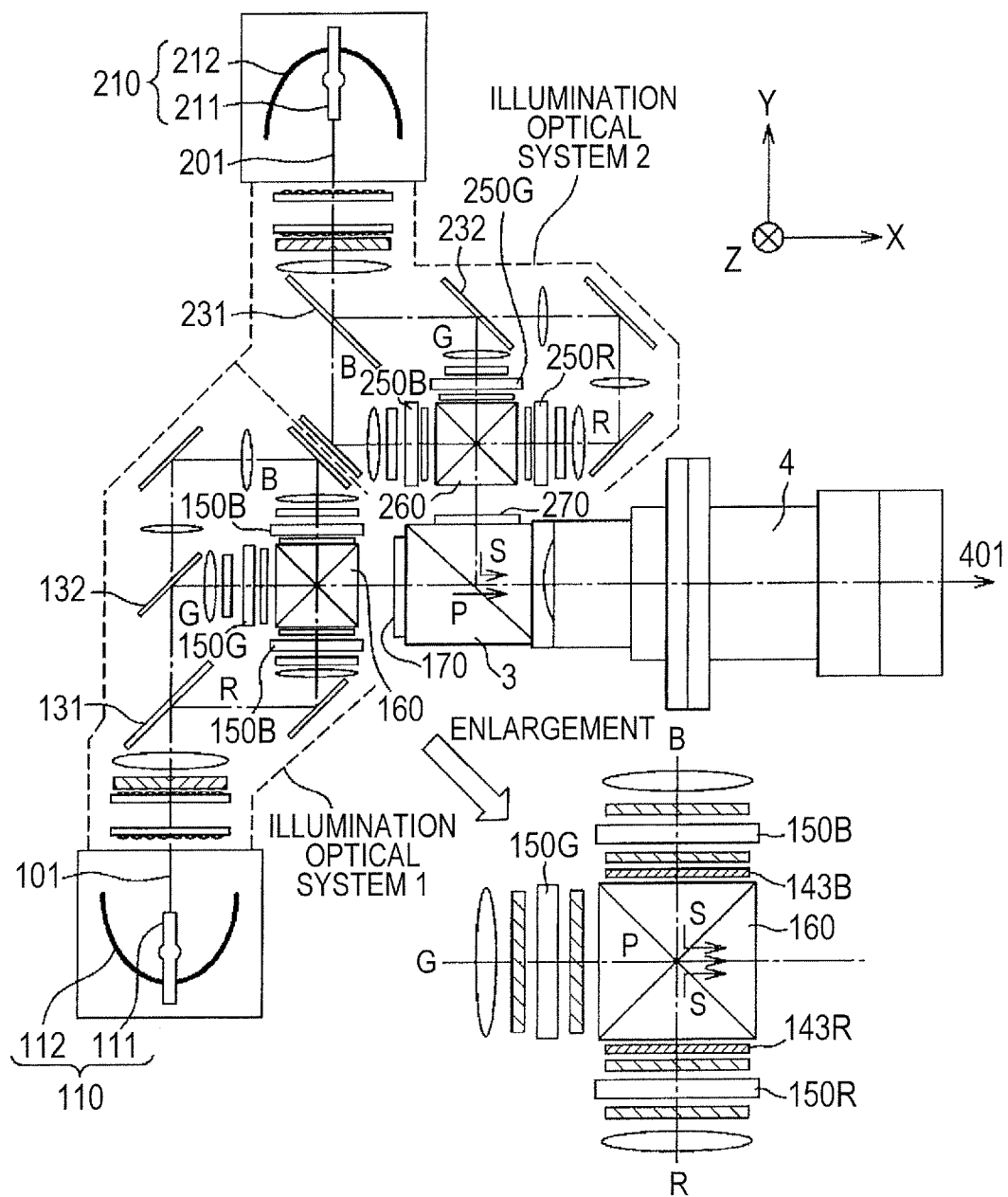
FIG. 2 is an overall block diagram of a projection image display device according to a second embodiment.

FIG. 2 is an overall block diagram of a projection image display device according to a second embodiment. In the second embodiment, the layout of the color separator within the illumination optical system 1 shown in the configuration of the first embodiment (FIG. 1) is changed and the liquid crystal panels 150R, 150B for the R light and the B light are replaced by each other. Because of this layout change, the R optical path and the B optical path are replaced by reflecting the R light from the dichroic mirror 131 and reflecting the G light from the dichroic mirror 132, while allowing the B light to pass through. The illumination optical system 2 and other configurations are the same as those in the first embodiment (FIG. 1).

With this configuration, the B light passes through the relay optical system in the illumination optical system 1, so that the length of the optical path is increased. Also, the R light passes through the relay optical system in the illumination optical system 2, so that the length of the optical path is increased. The effect of cancelling irregularities in the displayed image can be achieved by combing the illumination optical systems 1 and 2.

Third Embodiment

Figure 3:
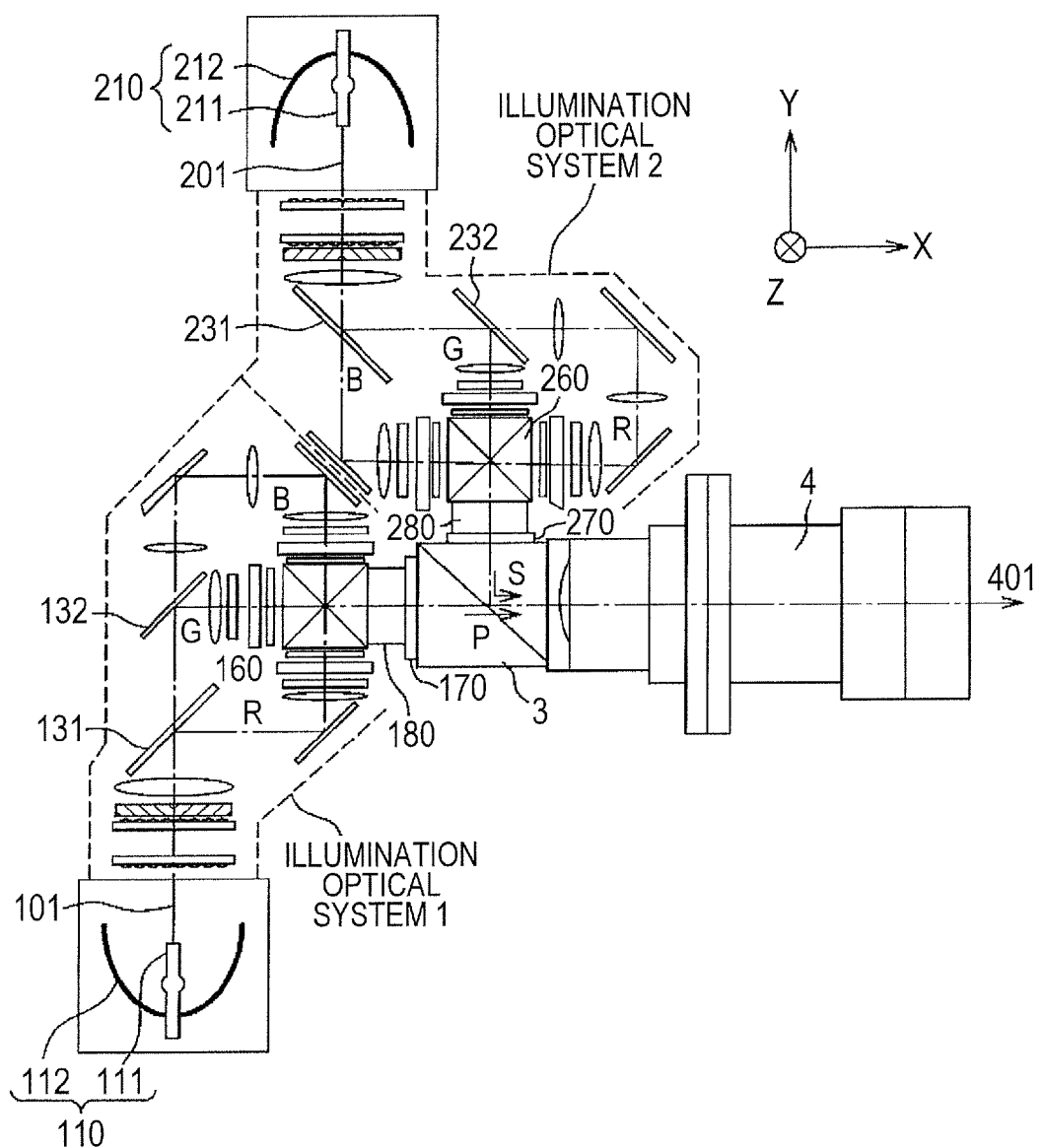
FIG. 3 is an overall block diagram of a projection image display device according to a third embodiment.

FIG. 3 is an overall block diagram of a projection image display device according to a third embodiment. In the third embodiment, glass plates 180 and 280 are inserted between each of the color synthesis prisms 160, 260 and the synthesizing polarization beam splitter 3 in the configuration of the second embodiment (FIG. 2). More specifically, the transparent glass plates 180 and 280 are inserted into the space from the color synthesis prisms 160, 260 to the color selection polarization rotators 170, 270, respectively.

With this configuration, it is possible to reduce the air interface in the optical path from each of the color synthesis prisms 160, 260 to the synthesizing polarization beam splitter 3, resulting in the effect of reducing the reflection loss of the transmitted optical images. The present embodiment can also be applied to the configuration of the first embodiment.

Next, a description will be given of an embodiment in which the optical images formed by the two illumination optical systems 1, 2 are not synthesized, but enlarged and projected from the two projection units, which are then synthesized and displayed on a screen and the like.

Fourth Embodiment

Figure 6:
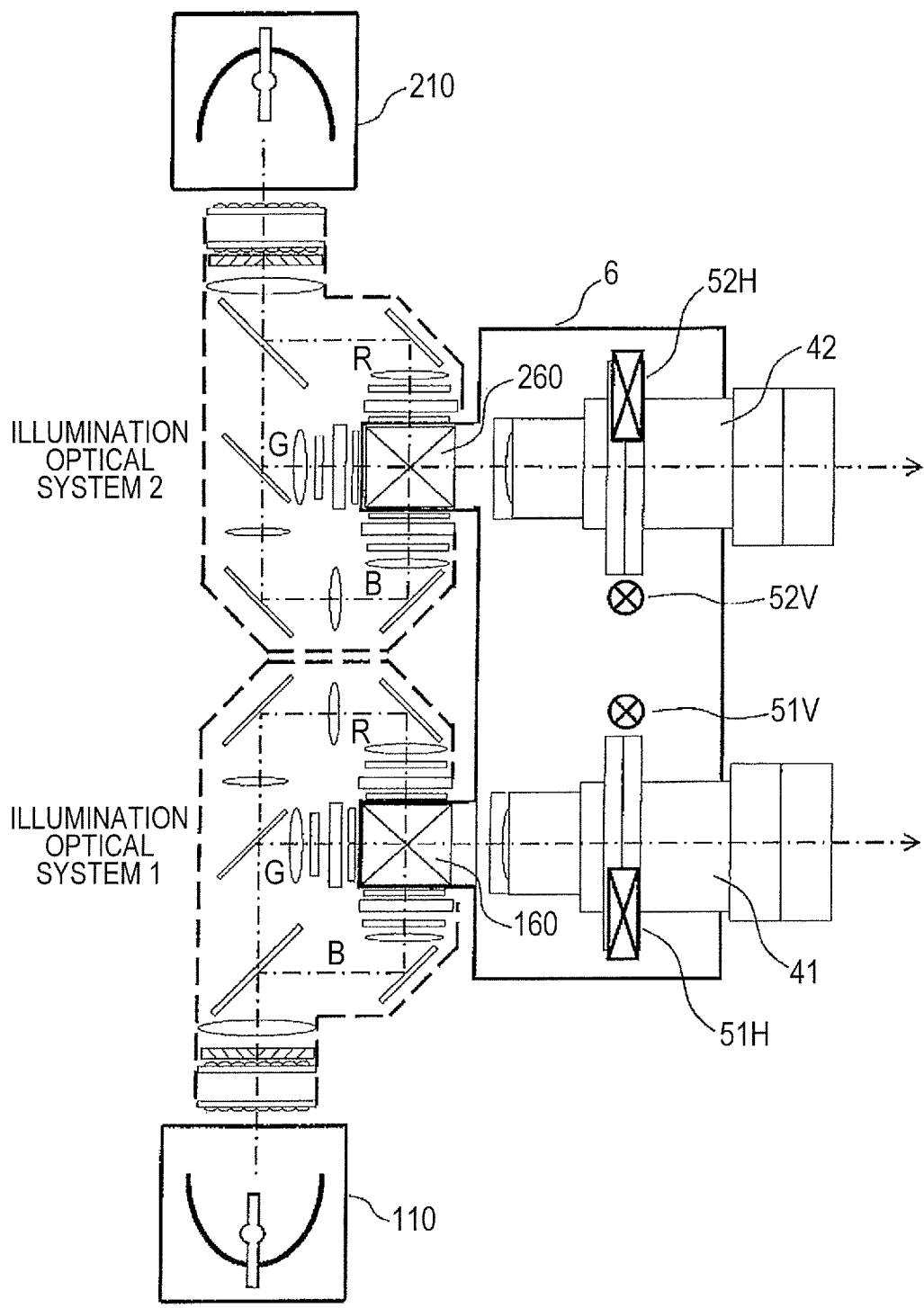
FIG. 6 is an overall block diagram of a projection image display device according to a fourth embodiment.

FIG. 6 is an overall block diagram of a projection image display device according to a fourth embodiment. The projection image display device of the present embodiment includes two illumination optical systems 1, 2 for forming optical images, and two projection units (projection lenses) 41, 42. Thus, the synthesizing polarization beam splitter (optical synthesis unit) 3 in the first to third embodiments is removed in the present embodiment. Like the first to third embodiments, the optical axes of the light source units 110, 210 in the respective illumination optical systems are positioned in the same plane as the projection direction, and also positioned in the direction orthogonal to the projection direction. The two illumination optical systems 1, 2 and the two projection units 41, 42 are placed on a support base 6. The projection units 41, 42 can be moved in the vertical direction (direction vertical to the paper) and the horizontal direction (direction perpendicular to the paper), respectively, by vertical movement mechanisms 51V, 52V and horizontal movement mechanisms 51H, 52H. Whit this configuration, it is possible to adjust (roughly adjust or slightly adjust) the display positions of the images to be projected by the projection units 41, 42 individually or in combinations. The support base 6 uses a rigid body, for example, such as Al, Mg die cast to prevent the creep deformation, making it possible to maintain the positional accuracy of the vertical movement mechanisms 51V, 52V and the horizontal movement mechanisms 51H, 52H, and to prevent the displayed image from moving on the screen.

In the present embodiment, the following functions are achieved by using the two illumination optical systems 1 and 2.

(1) The brightness of the displayed image is doubled by inputting the same image signal to the two illumination optical systems 1, 2, and by projecting the same image from the projection units 41, 42. Thus, compared to the configuration with a single illumination optical system, a high brightness image (for example, 10000 lumens or more) can be achieved at a low cost by using two inexpensive optical systems (light sources and liquid crystal panels).

(2) The projection positions of the two projection unit 41 and 42 are adjusted to display the two images by displacing the pixel positions corresponding to the two displayed images by a predetermined distance. This corresponds to positioning the images by displacing the pixel positions by ½ pixels as shown in FIGS. 4A and 4B. Then, the resolution of the displayed image can be increased to two times in a simulated manner by alternately inputting the image signal for each field.

Fifth Embodiment

Figure 7:
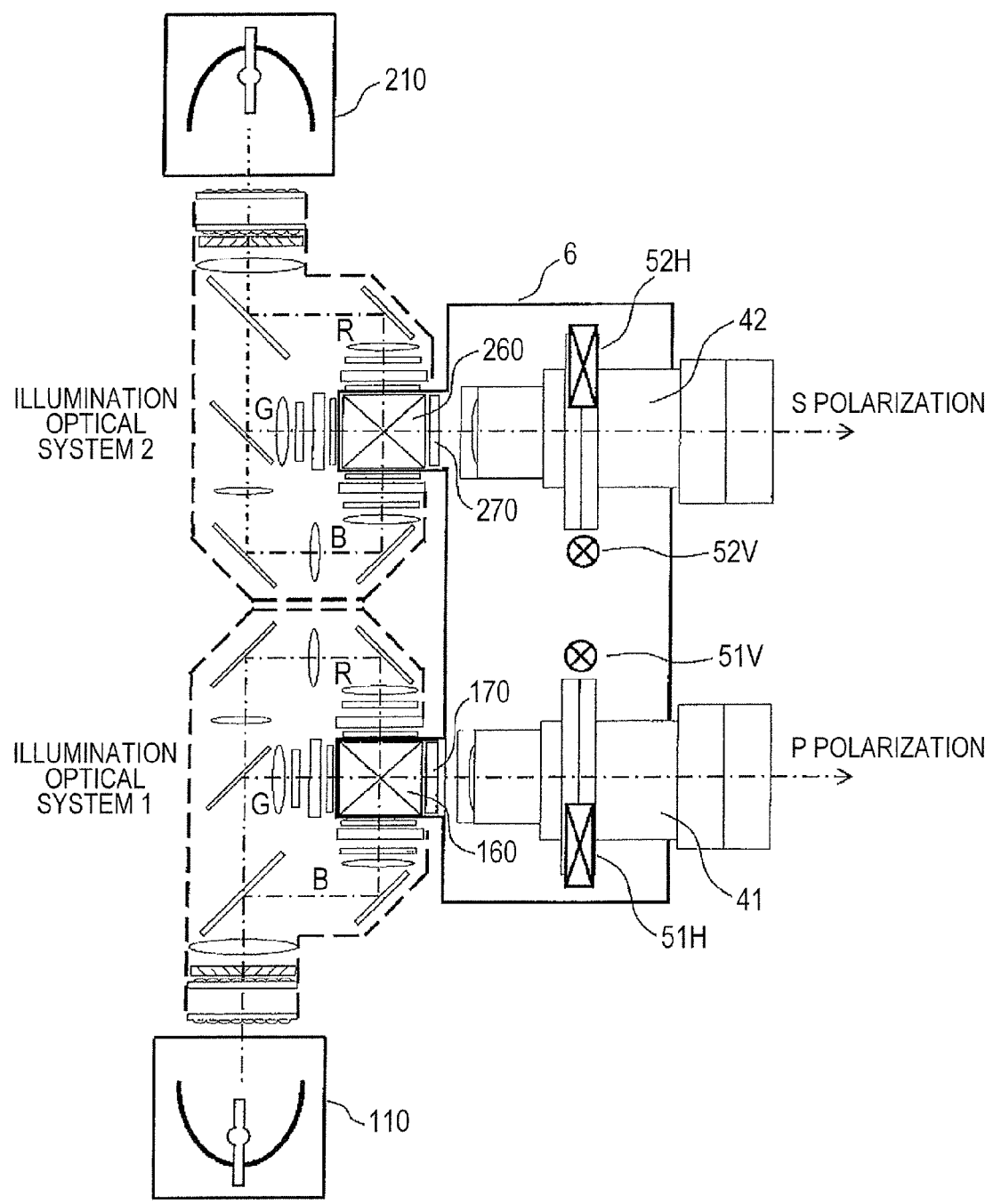
FIG. 7 is an overall block diagram of a projection image display device according to a fifth embodiment.

FIG. 7 is an overall block diagram of a projection image display device according to a fifth embodiment. Also in the present embodiment, like the fourth embodiment (FIG. 6), the two illumination optical systems 1, 2 and the two projection units 41, 42 are provided. The two illumination optical systems 1, 2 form optical images of different polarization characteristics, respectively, and project the optical images from the projection units 41, 42, respectively. The vertical movement mechanisms 51V, 52V and the horizontal movement mechanisms 51H, 52H that move between the projection units 41 and 42, as well as the support base 6 are the same as those in the fourth embodiment (FIG. 6).

In the present embodiment, the optical images formed by the respective illumination optical systems 1, 2 are different. Like the first to third embodiments, the illumination optical system 1 includes performing a color synthesis of the optical images of R, G, B lights by the color synthesis prism 160, converting the S polarized light of the R and B optical elements to the P polarized light by the color selection polarization rotator 160, and projecting the optical image in which all the color components are P polarized from the projection unit 41. On the other hand, the illumination optical system 2 includes performing a color synthesis of the optical images of the R, G, B lights by the color synthesis prism 260, converting the P polarized light of the G optical element to the S polarized light by the color selection polarization rotator 270, and projecting the optical image in which all the color components are S polarized from the projection unit 42.

According to the present embodiment, it is possible to display a three-dimensional image (3D image) by overlapping the optical image of the P polarized light and the optical image of the S polarized light on the display screen. The viewer uses polarization glasses to enjoy the real 3D image, for example, by selecting the image of the P polarized light by the left eye and selecting the image of the S polarized light by the right eye. Further, by providing an optical element (not shown) having the function of aligning the polarization direction to the end portion of the projection unit (projection lens) on the screen side, it is possible to increase the degree of polarization and achieve a good image.

Sixth Embodiment

Figure 8:
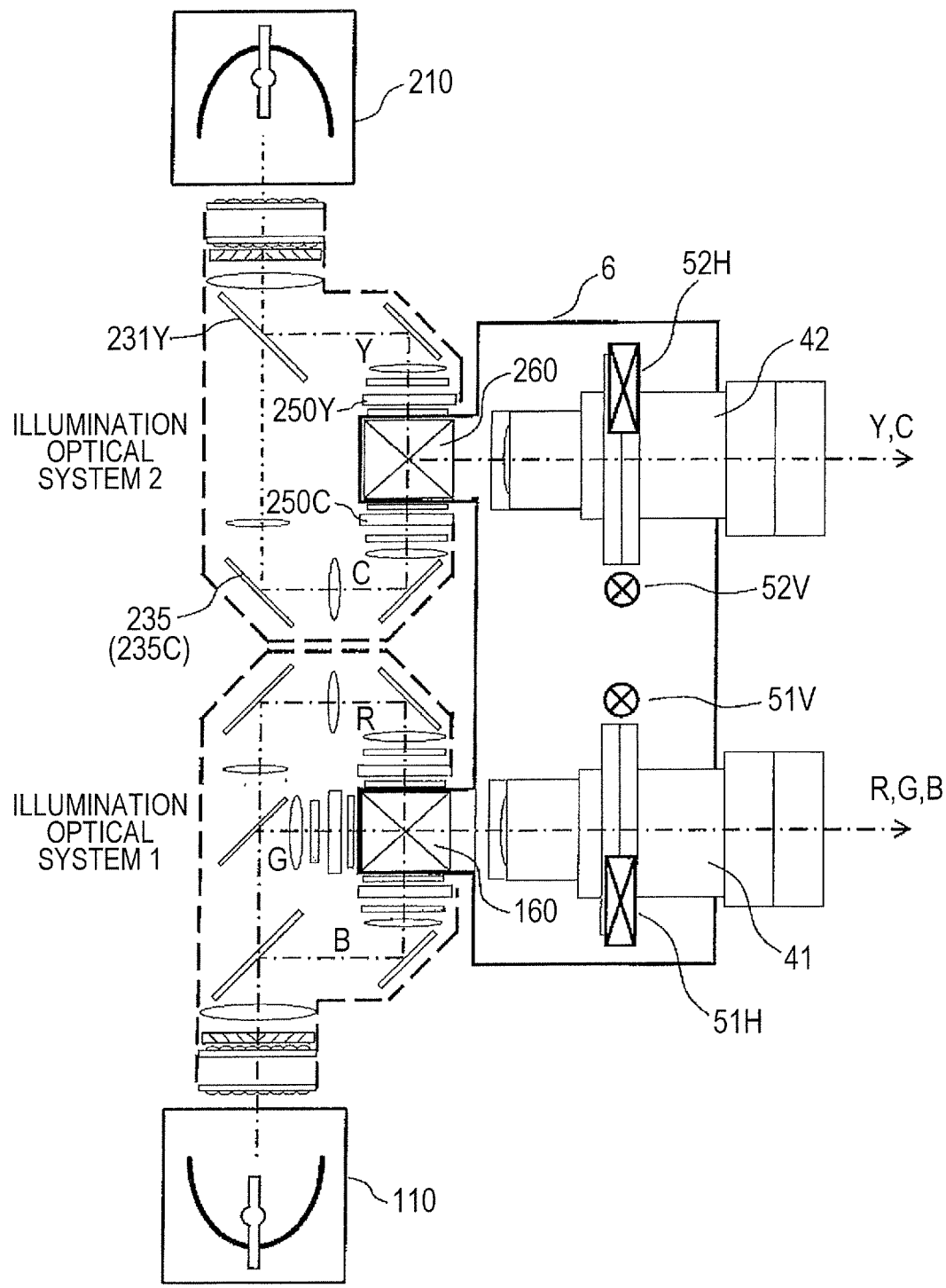
FIG. 8 is an overall block diagram of a projection image display device according to a sixth embodiment.

FIG. 8 is an overall block diagram of a projection image display device according to a sixth embodiment. Also in the present embodiment, like the fourth embodiment (FIG. 6), the two illumination optical systems 1, 2 and the two projection units 41, 42 are provided. The two illumination optical systems 1, 2 form optical images of different color components, respectively. Then, the optical images are projected from the respective projection units 41 and 42. The vertical movement mechanisms 51V, 52V and the horizontal movement mechanisms 51H, 52H that move between the projection units 41 and 42, as well as the support base 6 are the same as those in the fourth embodiment (FIG. 6).

Figure 11:
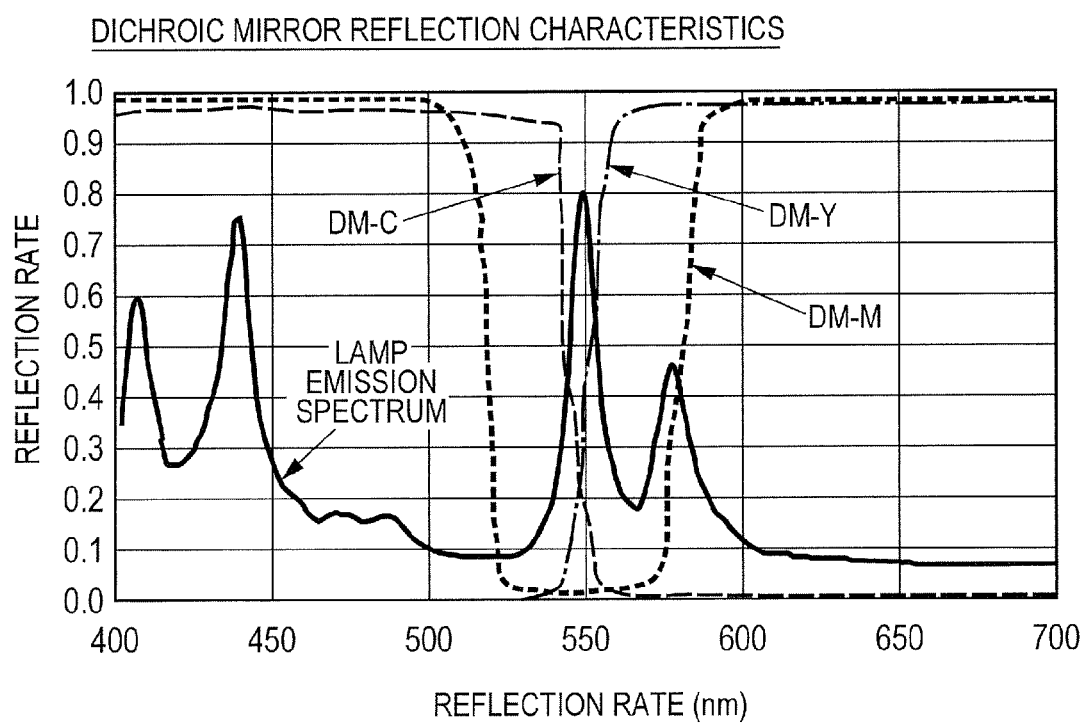
FIG. 11 is a view showing the reflection characteristics of a dichroic mirror.

Like the first to third embodiments, the illumination optical system 1 includes performing a color synthesis of the optical images of the R, G, B lights by the color synthesis prism 160, and projecting the synthesized image from the projection unit 41. On the other hands, the illumination optical system 2 includes performing a color synthesis of the optical images of the yellow (Y) and cyan (C) lights by the color synthesis prism 2, and projecting the synthesized image from the projection unit 42. Thus, the illumination optical system 2 uses two liquid crystals, namely, a liquid crystal panel 250Y for the Y light and a liquid crystal panel 250C for the C light. Then, in order to drive the liquid crystal panels 250Y and 250C, Y and C signals are separated from the image signal and supplied to the two liquid crystal panels. Further, the color separator of the illumination light uses a dichroic mirror 231Y (DM-Y) that reflects the Y light while allowing other elements to pass through. A mirror 235 is a normal reflective mirror. However, it is possible to increase the color purity of the C light by using a dichroic mirror 235C (DM-C) that reflects the C light. FIG. 11 shows the reflection characteristics of the dichroic mirrors DM-Y, DM-C. The optical images of the Y and C lights formed by the liquid crystal panels 250Y and 250C, respectively, are subjected to color synthesis by the color synthesis prism 260, and projected from the projection unit 42.

Figure 12:
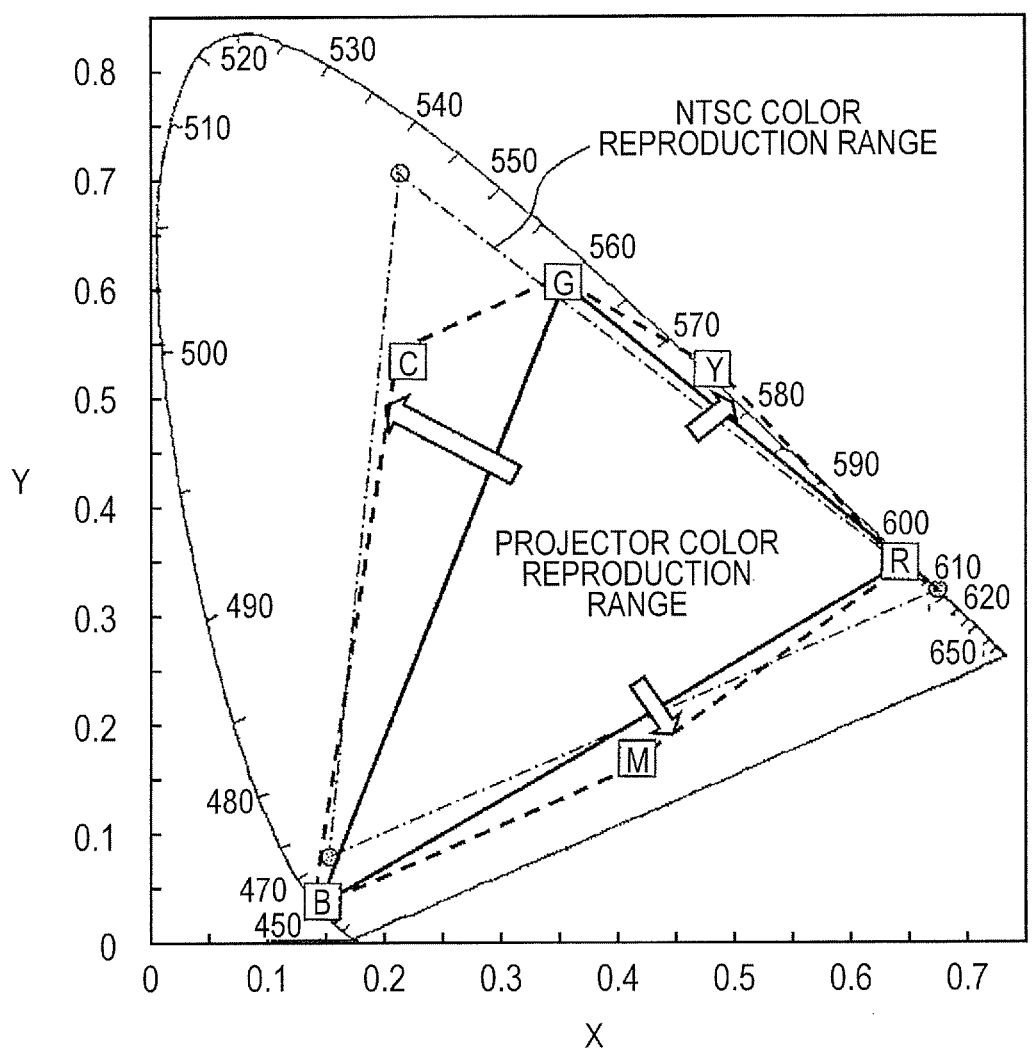
FIG. 12 is a chromaticity diagram showing the color reproduction range of the displayed image.

As a result, the optical image based on the R, G, B lights is projected from the projection unit 41, and the optical image based on the Y and C lights is projected from the projection unit 42. Then, the projected optical images are synthesized and displayed, so that the color reproduction of the displayed image can be increased. FIG. 12 is a chromaticity diagram showing the color reproduction range of the displayed image. The color reproduction range (solid line) in which the color reproduction can be achieved based on the R, G, B colors in a normal projector, can be increased to the color reproduction range (dashed line) by adding the Y and C colors. In this way, it is possible to approximate the NTSC color reproduction range (dashed and dotted line).

Seventh Embodiment

Figure 9:
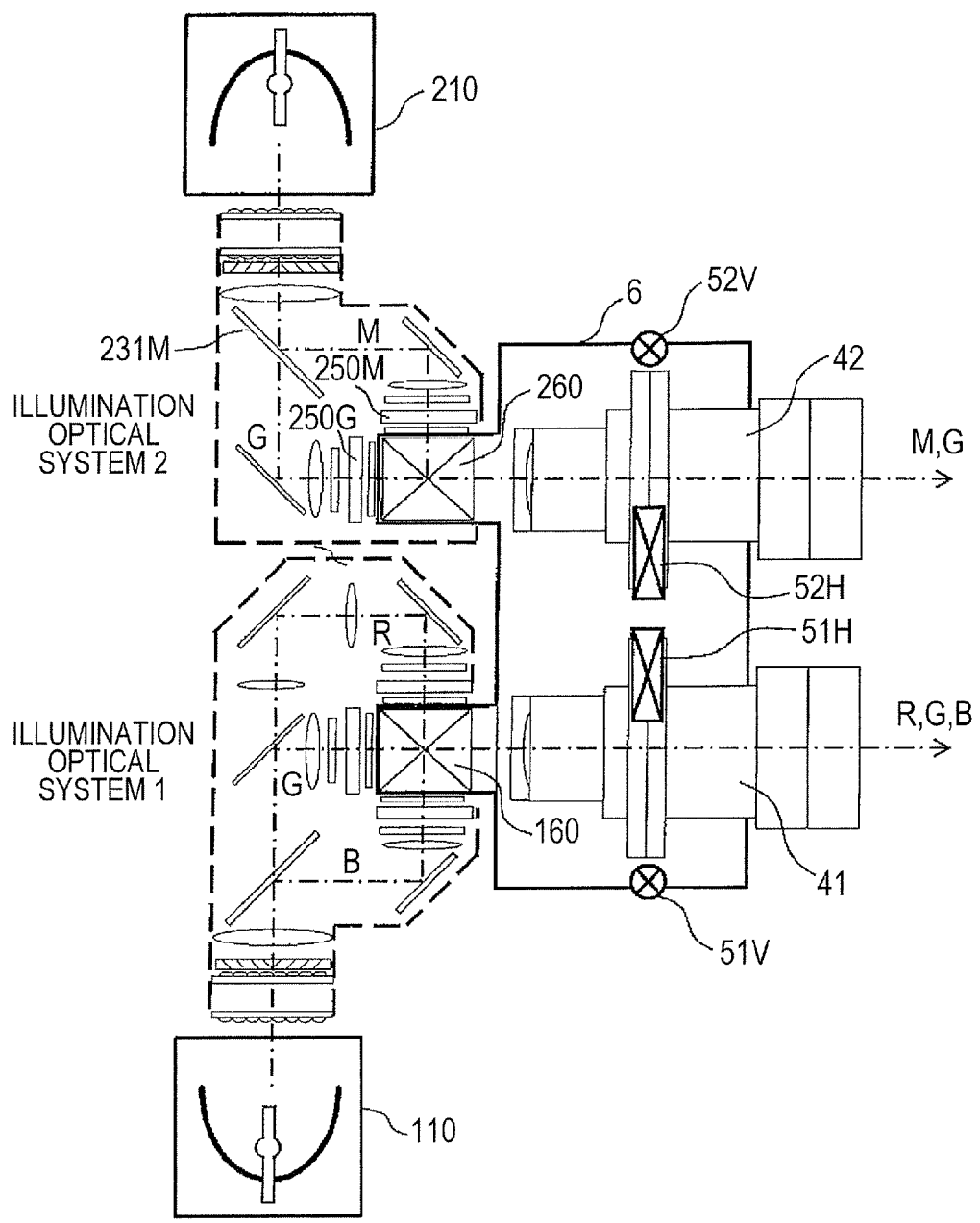
FIG. 9 is an overall block diagram of a projection image display device according to a seventh embodiment.

FIG. 9 is an overall block diagram of a projection image display device according to a seventh embodiment. Also in the present embodiment, like the sixth embodiment (FIG. 8), optical images of different colors are formed by the two illumination optical systems 1, 2, respectively, and projected from the projection units 41, 42, respectively. The illumination optical system 1 performs a color synthesis of the optical images of the R, G, B lights by the color synthesis prism 160, and projects the synthesized optical image from the projection unit 41. On the other hand, the illumination optical system 2 performs a color synthesis of the optical images of two color lights, magenta (M) and green (G), by the color synthesis prism 260, and projects the synthesized optical image from the projection unit 42. Thus, the illumination optical system 2 uses two liquid crystals, namely, a liquid crystal panel 250M for the M light and a liquid crystal panel 250G for the G light. Then, in order to drive the liquid crystal panels 250M and 250G, M and G signals are separated from the image signal and supplied to the respective liquid crystal panels. Further, the color separator of the illumination light uses a dichroic mirror 231M (DM-M) that reflects the Y light while allowing other elements to pass through. FIG. 11 shows the reflection characteristics of the dichroic mirror DM-M used in the color separator. The optical images of M and G lights formed by the liquid crystal panels 250M and 250G, respectively, are subjected to color synthesis by the color synthesis prism 260 and projected from the projection unit 42.

As a result, the optical image based on the R, G, B lights is projected from the projection unit 41, and the optical image based on the M and G lights is projected from the projection unit 42. These optical images are synthesized and displayed, so that the color reproduction of the displayed image can be increased. By adding the M color, the color reproduction range can be increased compared to the color reproduction range of the displayed image shown in FIG. 12. Further, by adding the G light, the brightness of the G color, which is likely to be reduced, can be recovered.

Further, in the present embodiment, the relay optical system (the optical system in which the light is incident from the opposite side of the M light with respect to the color synthesis prism 260) is removed, because it is no longer required due to the use of the two color lights in the illumination optical system 2. Then, the M and G lights separated by the dichroic mirror 231M irradiate the liquid crystal panels 250M and 250G, respectively, with substantially the same optical path lengths. As a result, it is possible to reduce the size of the illumination optical system 2, and to position the two projection units 41, 42 close to each other. Because of this configuration, the vertical movement mechanisms 51V, 52V are provided on the outside, and the horizontal movement mechanisms 51H, 52H are provided on the inside. Further, in the present embodiment, the two projection lenses are placed close to each other. Thus, it is possible to achieve a compact configuration around the projection lenses, and reduce the image circle of the projection lenses.

Figure 10A:
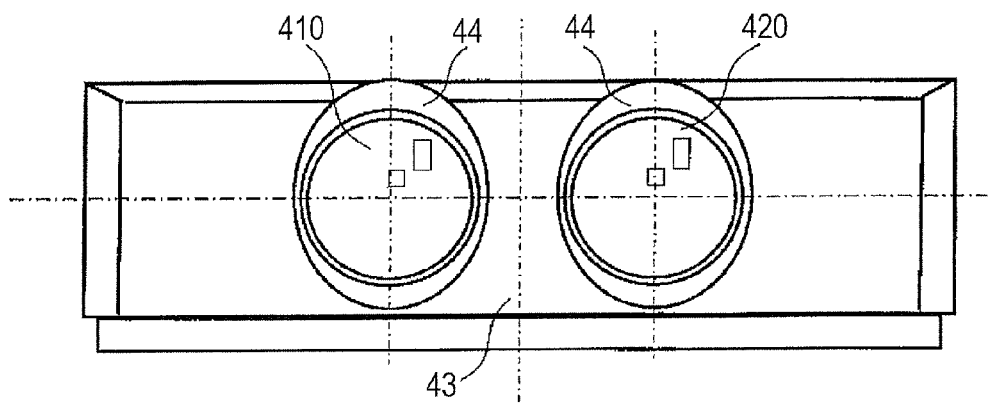
FIG. 10A is a general view of the front of the projection image display device according to the fourth to seventh embodiments.
Figure 10B:
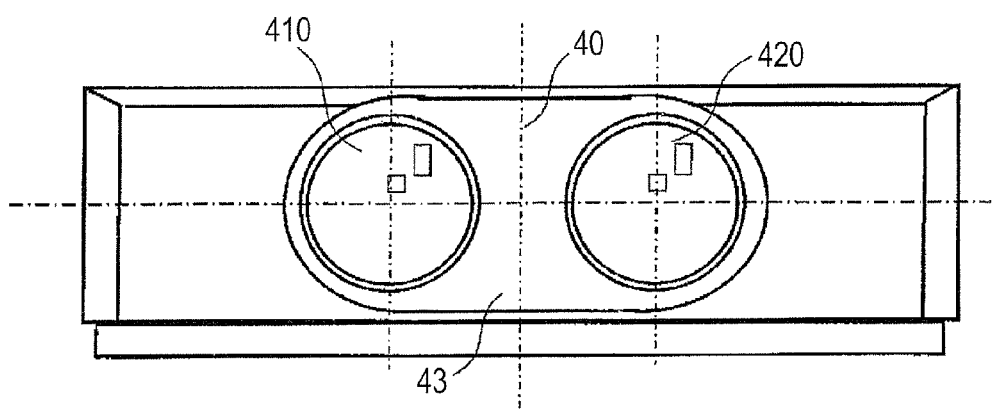
FIG. 10B is a general view of the front of the projection image display device according to the fourth to seventh embodiments.

FIGS. 10A and 10B are general views of the front of the projection image display devices according to the fourth to seventh embodiments. The two projection lenses 410, 420 are horizontally aligned. In FIG. 10A, an opening 44 for emitting projection light is provided in the front of each of the projection lenses 410, 420. Further, a light shielding portion 43 is provided to prevent light leakage between the two projection lenses 410 and 420. The light shielding portion 43 also serves as dust prevention. Further in FIG. 10B, each of the projection lenses 410, 420 is covered by an integrated lens cover 40. The integrated lens cover 40 has the functions of light leakage prevention and dust prevention.

Further, as described above, when displaying in 3D, each of the projection lenses 410, 420 is provided with the optical element (not shown) having the function of aligning the polarization direction, which is positioned closest to the screen in order to increase the degree of polarization and achieve an excellent 3D image.

In the first to seventh embodiment, the transparent liquid crystal panel is used as the optical image forming device. However, the present invention is not limited to the exemplary embodiments. A reflection type liquid crystal panel and a digital micro mirror device (DMD) (registered trademark of U.S. Texas Instruments) can also be used for the optical image forming device.

Eighth Embodiment

Figure 13:
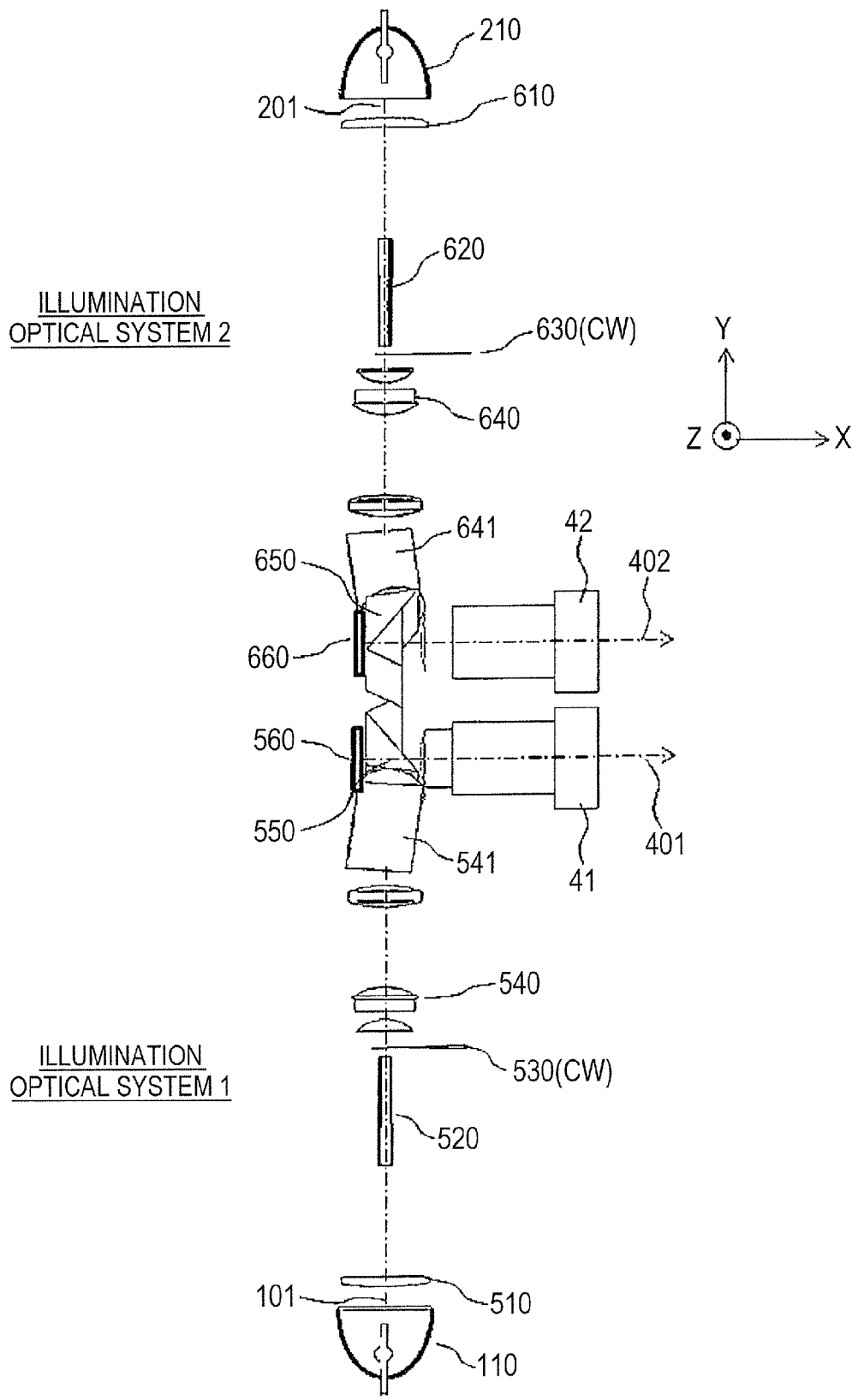
FIG. 13 is an overall block diagram of a projection image display device according to an eighth embodiment.

FIG. 13 is an overall block diagram of a projection image display device according to an eighth embodiment. The present embodiment uses the digital light processing (DLP) technology using a digital micro-mirror device (DMD) in which a plurality of small mirrors are arranged, as the optical image forming device. By using the DMD as the image display device, it is possible to increase the display speed and simplify the optical components.

Also in the present embodiment, like the fourth embodiment (FIG. 6), there are two illumination optical systems 1, 2 for forming optical images, respectively, and two projection units (projection lenses) 41, 42 for enlarging and projecting the two optical images, respectively. The configuration of each of the illumination optical systems will be described.

The light emitted from the respective light source units 110, 210 is incident into light tunnels 520, 620 through condensing lenses 510, 610, respectively. The light tunnels 520, 620 are prismatic optical glass, in which the incident light flux is divided into partial light fluxes and superimposed by multiple reflections. Thus, the intensity of illumination is equalized on the light-emission surface. Color wheels (CW) 530, 630 are rotating disks, each of which is divided into R, G, B filter regions. Each of the light fluxes from the light tunnels 520, 620 passing through the color wheels 530, 630 is divided, for example, into R, G, B color lights, and converted to a color sequential illumination light in which the color is sequentially changed in chronological order by synchronizing the rotation of the color wheels 530, 630.

After passing through the respective color wheels 530, 630, the light fluxes pass through the relay lenses 540, 640, the reflective mirrors 541, 641, and the like, respectively. Then, the light fluxes are reflected by total internal reflection (TIR) prisms 550, 650, and are incident to DMDs 560, 660 which are reflection type image display devices, respectively. The DMDs 550, 660 include hundreds of thousands to millions of micro mirrors arranged in the reflective surface. Each of the micro mirrors is inclined at a predetermined angle (for example, 10 degrees) by fast ON/OFF according to the input image signal. This is irradiated with the color sequential illumination light to form an optical image in the projection direction. At this time, the color of the illumination light and the RGB image signal are synchronized to form color sequential optical images. The formed optical images pass through the TIR prisms 550, 650, and are incident to the projection units (projection lenses) 41, 42, respectively. Then, the incident optical images are enlarged and projected on the screen.

Also in the present embodiment, the light source units 110, 210 in the respective illumination optical systems 1, 2 face each other. Further, the optical axes 101, 201 of the respective light source units 110, 210 are positioned in substantially the same plane as the projection directions 401, 402, and also positioned in the direction substantially orthogonal to the projection direction. Note that in the present embodiment, the illumination lights incident to the TIR prisms 550, 650 are inclined in the Z axis direction, so that there is a little distance between the optical axes 101 and 201 in the Z axis direction, but basically they are still in the same plane. Further, the use of the two illumination optical systems 1, 2 results in the following effects: (1) increase the blitheness of the displayed image to two times (when the same image is projected); and (2) increase the resolution of the displayed imaged to two times in a simulated manner (when two images are displaced by ½ pixels and projected).

Figure 14:
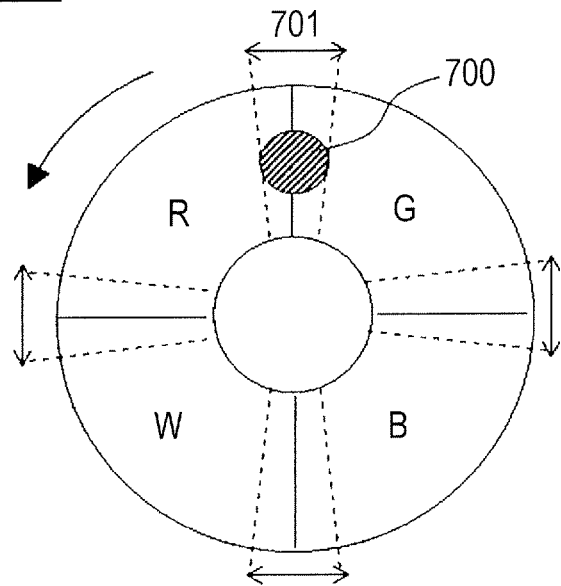
FIG. 14 is a view of the shape of each color wheel.

FIG. 14 is a view of the shape of each of the color wheels 530, 630. The color wheel is divided into a plurality of regions (segments), each having the filter characteristics of R, G, B or W (white, all colors passing through). The color wheel is rotated at a predetermined speed, switching the white light from the light source to the R, G, B, and W illumination lights sequentially. When the interface of each segment is irradiated with a light beam 700, there is a period of time (spoke time 701) that the light beam 700 moves between the two segments. In this period of time 701, two colors are mixed in the illumination light, so that the image signal is turned off to the DMDs 560, 660 which are the image display devices.

Figure 15:
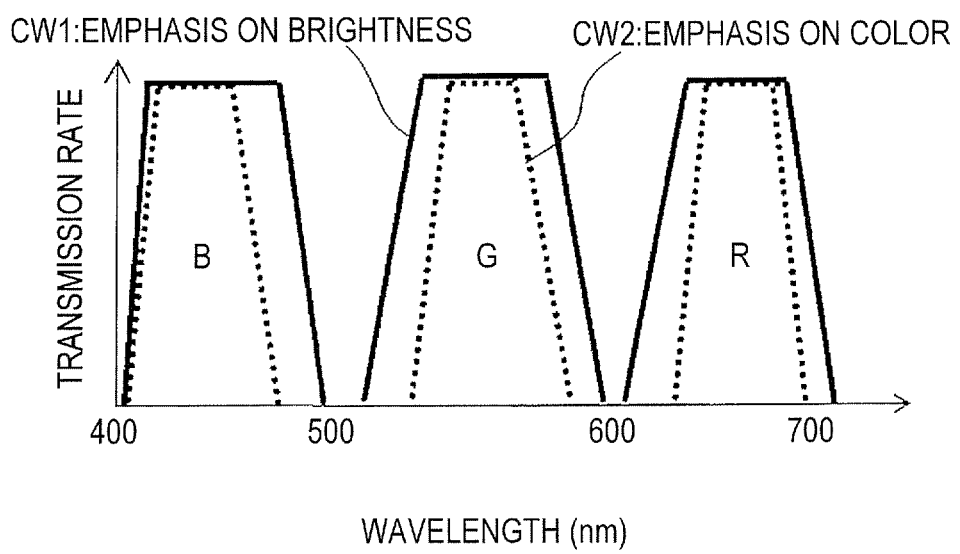
FIG. 15 is a view of the filter characteristics of the color wheel.

FIG. 15 is a view of the filter characteristics of the color wheels 560, 660, showing the transmission characteristics for the R, G, B filters. CW1 (shown by the solid line) is the case in which the transmission bandwidth of each color is wide, which is advantageous in increasing the display brightness. On the other hand, CW2 (shown by the dotted line) is the case in which the transmission bandwidth of each color is narrow, which is advantageous in increasing the color purity.

In the present embodiment, two color wheels 530 and 630 are provided, each of which can have different the filter characteristics. For example, the color wheel 530 has the characteristics of CW1 with a wide bandwidth, and the color wheel 630 has the characteristics of CW2 with a narrow bandwidth. In this way, it is possible to achieve both the brightness and color purity of the displayed image at the same time.

Here, it has been described the case in which the illumination light is divided into three R/G/B color lights. However, it is also possible to use filters to separate into other colors, such as yellow (Y), cyan (C), and magenta (M), in addition to the R/G/B filters.

Ninth Embodiment

Figure 16A:
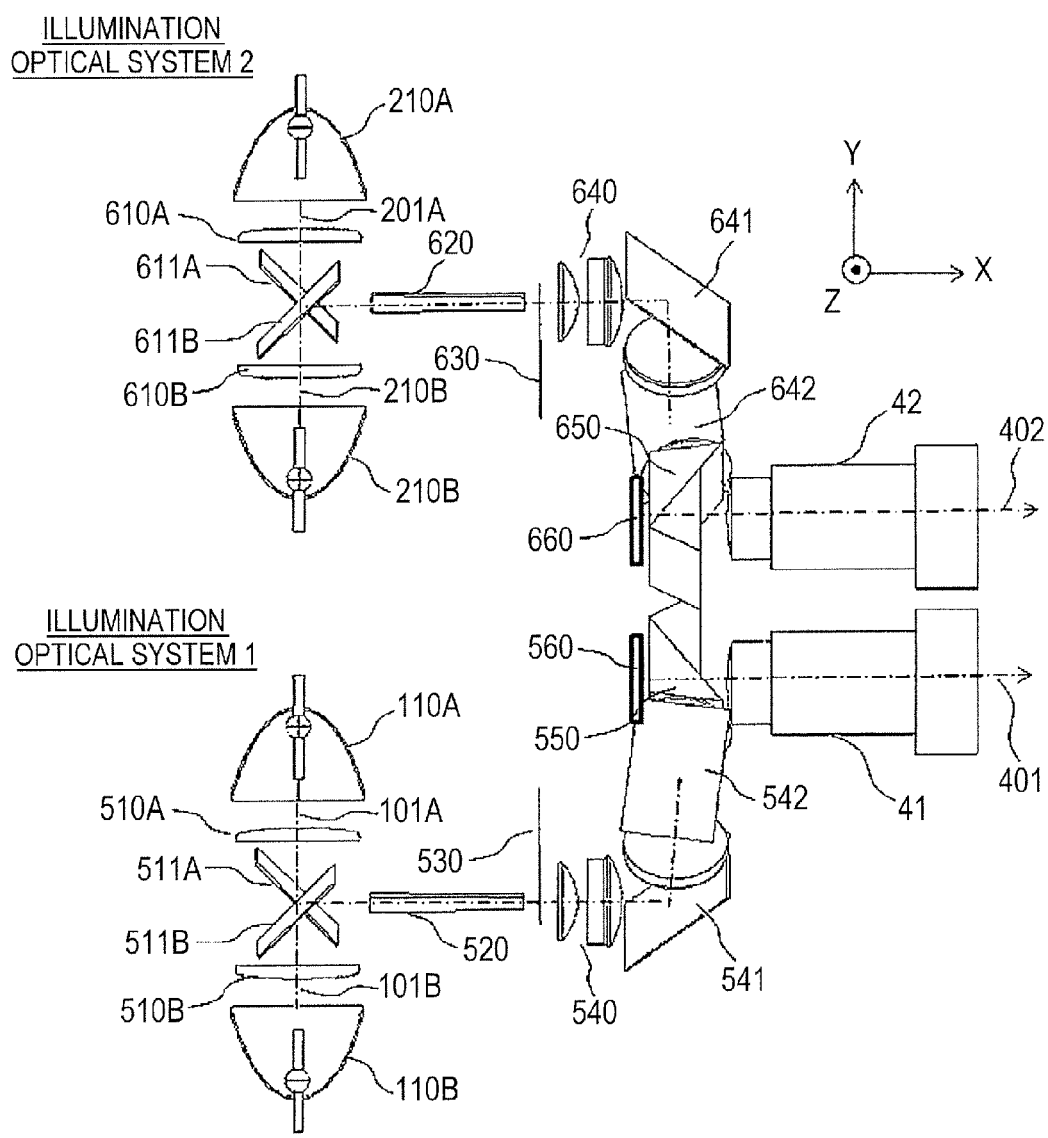
FIG. 16A is an overall block diagram of a projection image display device according to a ninth embodiment (plan view)
Figure 16B:
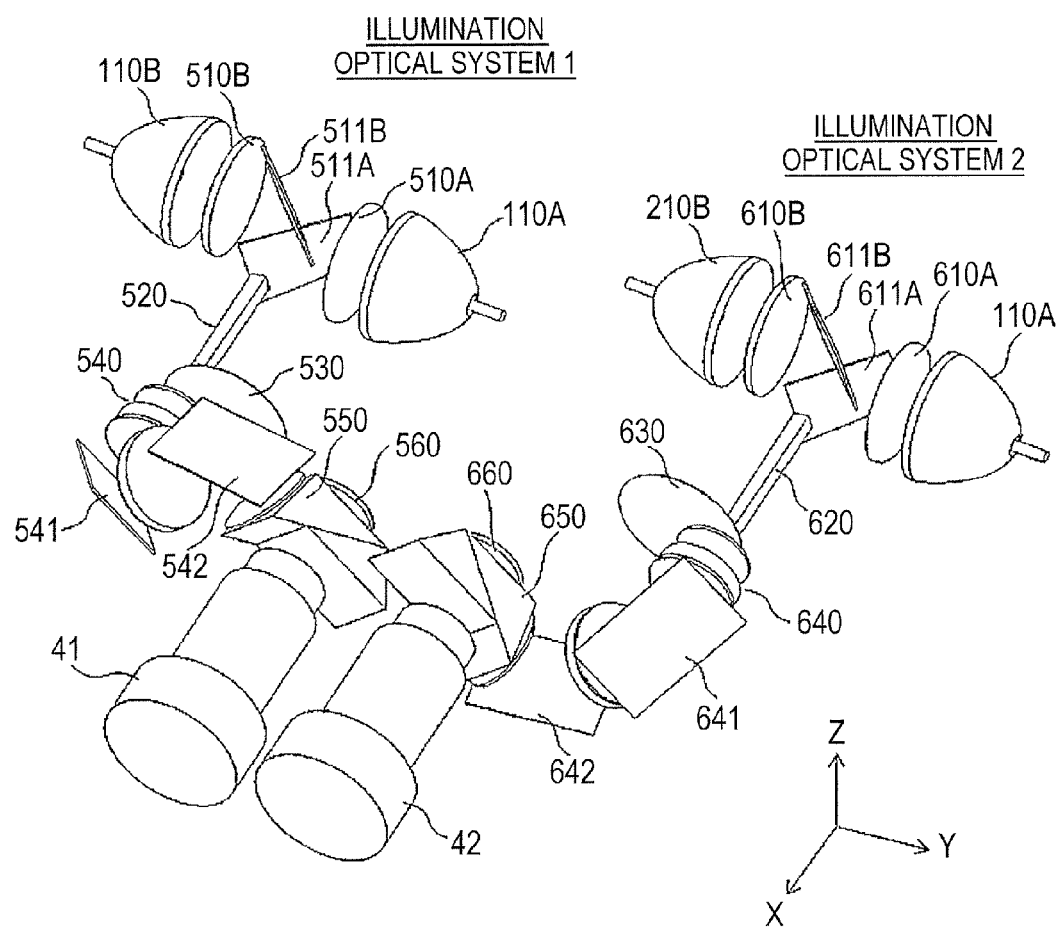
FIG. 16B is an overall block diagram of the projection image display device according to the ninth embodiment (three-dimensional view).

FIGS. 16A and 16B are overall block diagrams of a projection image display device according to a ninth embodiment. FIG. 16A is a plan view of the projection image display device, and FIG. 16B is a three-dimensional view as seen from the projection side.

In the present embodiment, each of the illumination optical systems 1, 2 in the eighth embodiment (FIG. 13) has two light source units (four light source units in total). In other words, in the illumination optical system 1, two light units 110A, 110B are disposed to face each other. The lights emitted from the two light source units 110A, 110B pass through condensing lenses 510A, 510B, respectively. Then, the lights are reflected by reflective mirrors 511A, 511B, respectively, and incident to the common light tunnel 520. Similarly in the illumination optical system 2, two light source units 210A, 210B are disposed to face each other. The lights emitted from the two light source units 210A, 210B pass through condensing lenses 610A, 610B, respectively. Then, the lights are reflected by reflective mirrors 611A, 611B, respectively, and incident to the common light tunnel 620.

The light fluxes from the light tunnels 520, 620 pass through the rotating color wheels 530, 630, in which the color is sequentially changed to provide color sequential illumination light. After passing through the color wheels 530, 630, the light fluxes pass through the relay lenses 540, 640, the reflective lenses 541, 542, 641, 642, and the like, respectively. Then, the light fluxes are reflected by the TIR prisms 550, 650, and incident to the DMDs 560, 660 which are reflection type image display devices. The optical images formed by the DMDs 560, 660 pass through the TIR prisms 550, 650, respectively, and are enlarged and projected from the projection units (projection lenses) 41, 42 to the screen.

Also in the present embodiment, the optical axes of the light source units 110A, 110B, 210A, 210B in the illumination optical systems 1, 2 are positioned in substantially the same plane as the projection directions 401, 402, respectively, and also in the direction substantially orthogonal to the projection direction. Note that in the case of the present embodiment, the reflective mirrors 511A, 511B, 611A, 611B are three-dimensionally disposed, so that there is a little distance between the optical axes 101A and 101B, and between the optical axes 201A and 201B in the Z axis direction, but basically they are still in the same plane.

In the present embodiment, there are four light source units, leading to the effect of increasing the lifetime of the light source units (when used alternately), or the effect of reducing costs by combining low brightness light sources (when used at the same time).

Further, in the present embodiment, the optical axes of the light tunnels 520, 620 are substantially parallel to the projection directions 401, 402. In this regard, in the eighth embodiment (FIG. 13), the optical axes of the light tunnels 520, 620 are orthogonal to the projection directions 401, 402. As a result, the distance between the two light source units 110 and 210 increases, so that the width of the device has to be increased in the Y direction. With the configuration of the present embodiment, it is possible to prevent the expansion of the device in the Y direction, and to achieve the shape balanced in the X and Y directions.

The present invention is not limited to the configurations of the embodiments described above. The present invention also includes the combination of the configuration of each of the embodiments. The embodiments described herein involve the projection image display device including two illumination optical systems 1, 2. Further, the present invention can also be applied to a projection image display device in which two or more illumination optical systems are combined. In this case also, each of the optical axes of the light sources in the respective illumination optical systems is positioned in the same plane as the projection direction and also in the direction orthogonal to the projection direction.

LIST OF REFERENCE SIGNS 1, 2: Illumination optical system, 3: Synthesizing polarization beam splitter (Light synthesis unit), 4, 41 (410), 42 (420): Projection unit (projection lens), 43: Light shielding portion, 44: Opening, 51V, 52V: Vertical movement mechanism, 51H, 52H: Horizontal movement mechanism, 6: Support base, 101, 201; Optical axis, 110, 210: Light source unit, 111, 211: Light source (Lamp), 131, 132, 231, 232: Dichroic mirror, 141: Incident-side polarization plate, 142: Emission-side polarization plate, 143: ½ Wavelength plate, 150, 250: Liquid crystal panel, 160, 260: Color synthesis prism, 170, 270: Color selection polarization rotator, 180, 280: Glass plate, 401, 402: Optical axis of projection lens: 520, 620: Light tunnel, 530, 630: Color wheel, 550, 650: TIR prism, 560, 660: Image display device (DMD).

The invention claimed is:

1. A projection image display device for projecting an optical image formed by a plurality of illumination optical systems from a projection lens,
    wherein each of the plurality of illumination optical systems comprises:
    a light source for generating illumination light from a discharge lamp;
    a color separator for separating the generated illumination light into three color lights of R (red), G (green), and B (blue);
    three liquid crystal panels for forming optical images by irradiation of the respective color lights; and
    a color synthesis unit for synthesizing the optical images of the different color lights,
    wherein an optical axis of each of the light sources and an optical axis of the projection lens are positioned in the same plane,
    wherein all the optical axes of the respective light sources are oriented orthogonal to the optical axis of the projection lens,
    wherein in two illumination optical systems of the plurality of illumination optical systems, an optical path of the illumination light and an optical path of the color separator are rotated by 90 degrees with respect to each other.

2. The projection image display device according to claim 1,
    wherein the projection image display device comprises a synthesizing polarization beam splitter for synthesizing optical images formed by the plurality of illumination optical systems, and the projection lens for projecting the optical image synthesized by the synthesizing polarization beam splitter,
    wherein a color selection polarization rotator is provided on two incident surfaces of the synthesizing polarization beam splitter to rotate the polarization of the light in a selected wavelength band,
    wherein one incident optical image is polarized in a predetermined direction, and the other incident optical image is polarized in the direction orthogonal to the specific direction.

3. The projection image display device according to claim 2,
wherein each of the illumination optical systems comprises a relay optical system to allow the color light of a longer optical path length than others of the three color lights separated by the color separator, to pass through,
wherein the relay optical system allows the R light to pass through in all the illumination optical systems.

4. The projection image display device according to claim 2,
wherein each of the illumination optical systems comprises a relay optical system to allow the color light of a longer optical path length than others of the three color lights separated by the color separator, to pass through,
wherein the plurality of illumination optical systems include a relay optical system to allow the R light to path through, as well as a relay optical system to allow the B light to pass through.

5. The projection image display device according to claim 2,
wherein a glass plate is inserted into the space between the color synthesis unit and the color selection polarization rotator.

6. A projection image display device for projecting an optical image formed by each of a plurality of illumination optical systems from each of a plurality of projection lenses,
wherein the projection image display device comprises:
a support base of a rigid body on which the plurality of projection lenses are placed; and
a movement mechanism for moving the positions of the plurality of projection lenses independently,
wherein the display positions of a plurality of optical images projected from the plurality of projection lenses are adjusted by the movement mechanism,
wherein each of the plurality of illumination optical systems includes:
a light source for generating illumination light from a discharge lamp;
a color separator for separating the generated illumination light into three color lights of R (red), G (green), and B (blue);
three liquid crystal panels for forming optical images by irradiation of the respective color lights; and
a color synthesis unit for synthesizing the optical images of the different color lights,
wherein an optical axis of each of the light sources and an optical axis of the projection lens are positioned in the same plane,
wherein all the optical axes of the light sources are oriented orthogonal to the optical axis of the projection lens,
wherein two light sources of the plurality of light sources are disposed to face each other in the emission direction with the projection lens between them.

7. The projection image display device according to claim 6,
wherein a color selection polarization rotator is provided on the light emission side of the plurality of illumination optical systems, to rotate the polarization of the light in a selected wavelength band,
wherein one of a plurality of optical images projected from the plurality of projection lenses is polarized in a predetermined direction, and the other is polarized in the direction orthogonal to the specific direction, by the color selection polarization rotator.

8. A projection image display device for projecting an optical image formed by two illumination optical systems from a projection lens,
wherein a first illumination optical system includes:
a light source for generating illumination light from a discharge lamp;
a color separator for separating the generated illumination light into three color lights of R (red), G (green), and B (blue);
three liquid crystal panels for forming optical images by irradiation of the respective color lights; and
a color synthesis unit for synthesizing the optical images of the different color lights,
wherein a second illumination optical system includes:
a light source for generating illumination light from a discharge lamp;
a color separator for separating the generated illumination light into two color lights of Y (yellow) and C (cyan);
two liquid crystal panels for forming optical images by irradiation of the respective colors; and
a color synthesis unit for synthesizing the optical images of the different color lights,
wherein an optical axis of each of the light sources and an optical axis of the projection lens are positioned in the same plane,
wherein all the optical axes of respective the light sources are oriented orthogonal to the optical axis of the projection lens.

9. A projection image display device for projecting an optical image formed by two illumination optical systems from a projection lens,
wherein a first illumination optical system includes:
a light source for generating illumination light from a discharge lamp;
a color separator for separating the generated illumination light into three color lights of R (red), G (green), and B (blue);
three liquid crystal panels for forming optical images by irradiation of the respective color lights; and
a color synthesis unit for synthesizing the optical images of the different color lights,
wherein a second illumination optical system includes:
a light source for generating illumination light from a discharge lamp;
a color separator for separating the generated illumination light into two color lights of M (magenta) and G (green);
two liquid crystal panels for forming optical images by irradiation of the respective color lights; and
a color synthesis unit for synthesizing the optical images of the different color lights,
wherein an optical axis of each of the light sources and an optical axis of the projection lens are positioned in the same plane,
wherein all the optical axes of the respective light sources are oriented orthogonal to the optical axis of the projection lens.

10. The projection image display device according to claim 8,
wherein the second illumination optical system is designed to irradiate the liquid crystal panels with the two color lights separated by the color separator, respectively, with substantially the same lengths.

11. A projection image display device for projecting an optical image formed by a plurality of illumination optical systems from a projection lens,
wherein each of the plurality of illumination optical systems comprises:
a light source for generating illumination light from a discharge lamp;

a color separator for separating the generated illumination light into R (red), G (green), and B (blue);

three liquid crystal panels for forming optical images by irradiation of the respective color lights; and a color synthesis unit for synthesizing the optical images of the different color lights, wherein an optical axis of each of the light sources and an optical axis of the projection lens are positioned in the same plane, wherein all the optical axes of the respective light sources are oriented orthogonal to the optical axis of the projection lens, wherein two light sources of the plurality of light sources are disposed to face each other in the emission direction with the projection lens between them, wherein a color selection polarization rotator is provided on the surface facing the projection lens of the color synthesis unit corresponding to at least one illumination optical system, allowing the polarization direction of at least one of the three color lights to be oriented to the polarization direction of the other color lights, wherein a color selection polarization rotator is provided on the surface facing the projection lens of the color synthesis unit corresponding to the other illumination optical system, allowing the polarization direction of at least one of the three color light to be oriented to the polarization direction of the other color lights, so that the polarization direction is different from the polarization direction oriented in the former illumination optical system, wherein the plurality of illumination optical systems are placed in the same chassis.

12. The projection image display device according to claim 11, wherein the projection image display device comprises a plurality of projection lenses for projecting optical images formed by the plurality of illumination optical systems, respectively, wherein the projection lens includes a plurality of single lenses and an optical element having the function of adjusting the polarization direction, which are aligned along the optical axis of the projection lens.

13. The projection image display device according to claim 11, wherein the projection image display device comprises the plurality of projection lenses for projecting optical images formed by the plurality of illumination optical systems, respectively, wherein the projection lens includes a plurality of single lenses and an optical element having the function of adjusting the polarization direction, wherein the optical element is provided on the side of the image projection surface of the single lens closest to the image projection surface.

14. The projection image display device according to claim 2, wherein the two color selection polarization rotators provided on the two incident surfaces of the synthesizing polarization beam splitter are rotated by 90 degrees with respect to each other.

15. A projection image display device for projecting an optical image formed by a plurality of illumination optical systems from a projection lens, wherein each of the plurality of illumination optical systems comprises:

a light source for generating illumination light from a discharge lamp;

a color separator for separating the generated illumination light into three color lights of R (red), G (green), and B (blue);

three liquid crystal panels for forming optical images by irradiation of the respective color lights; and a color synthesis unit for synthesizing the optical images of the different color lights, wherein an optical axis of each of the light sources and an optical axis of the projection lens are positioned in the same plane, wherein all the optical axes of the light sources are oriented orthogonal to the optical axis of the projection lens, wherein two light sources of the plurality of light sources are disposed to face each other in the emission direction with the projection lens between them.

16. A projection image display device for projecting optical images formed by a plurality of illumination optical systems from a plurality of projection lenses, respectively, wherein each of the plurality of illumination optical systems comprises:

a light source for generating illumination light from a discharge lamp;

a light tunnel for equalizing the illumination intensity of the generated illumination light;

a color wheel for converting the illumination light into color sequential illumination light of a plurality of colors;

a reflection type image display device for forming color sequential optical images from the color sequential illumination light by turning on/off each of the micro mirrors according to the input image signal, wherein an optical axis of each of the light sources and an optical axis of the projection lens are positioned in the same plane, wherein all the optical axes of the light sources are oriented orthogonal to the optical axis of the projection lens, wherein two light sources of the plurality of light sources are disposed to face each other in the emission direction with the projection lens between them.

17. The projection image display device according to claim 16, wherein each of the plurality of illumination optical systems comprises a plurality of light sources facing each other as the light source, wherein the illumination lights generated by the plurality of light sources are guided to the common light tunnel, wherein the optical axis of the light tunnel is substantially parallel to the optical axis of the projection lens.

18. The projection image display device according to claim 16, wherein each color wheel in the plurality of illumination optical systems has filter characteristics to allow each of a plurality of color lights to pass through, wherein the transmission bandwidths for different color lights in each of the color wheels overlap each other.

19. The projection image display device according to claim 9, wherein the second illumination optical system is designed to irradiate the liquid crystal panels with the two color lights separated by the color separator, respectively, with substantially the same lengths.

* * * * *